United States Patent
Saito et al.

(10) Patent No.: US 8,254,223 B2
(45) Date of Patent: Aug. 28, 2012

(54) OPTICAL DRIVE DEVICE AND TILT DETECTION METHOD

(75) Inventors: Kimihiro Saito, Kanagawa (JP); Takeshi Kubo, Kanagawa (JP); Norihiro Tanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 39 days.

(21) Appl. No.: 12/906,477

(22) Filed: Oct. 18, 2010

(65) Prior Publication Data
US 2011/0096648 A1    Apr. 28, 2011

(30) Foreign Application Priority Data
Oct. 23, 2009   (JP) ................................ 2009-244389

(51) Int. Cl.
G11B 7/00    (2006.01)
(52) U.S. Cl. .................. 369/44.32; 369/53.19
(58) Field of Classification Search ............... 369/44.37, 369/44.32, 47.1, 22.26, 44.27, 44.28, 53.19, 369/53.1, 53.12, 53.42, 53.28, 44.26, 94
See application file for complete search history.

(56) References Cited

U.S. PATENT DOCUMENTS
7,916,585 B2 * 3/2011 Saito ..................... 369/44.27
2009/0153929 A1 * 6/2009 Jeong et al. ................ 359/31

FOREIGN PATENT DOCUMENTS
| JP | 2008-071435 A | 3/2008 |
| JP | 2008-135144 A | 6/2008 |
| JP | 2008-176902 A | 7/2008 |

* cited by examiner

*Primary Examiner* — Nabil Hindi
(74) *Attorney, Agent, or Firm* — Wolf, Greenfield & Sacks, P.C.

(57) ABSTRACT

An optical drive device for performing information recording or reproduction of recorded information by formation of a mark by focusing a first light at a necessary position in a recording layer of an optical recording medium by an objective lens includes a position control unit configured to focus a second light on a reflection film, in which a position guide element of the optical recording medium is formed, through the objective lens and to enable the spot position of the second light to follow the position guide element based on the reflected light of the second light focused on the reflection film so as to control the position of the objective lens. The optical drive device further includes a first focusing unit, a first light-sensing portion, and a surface reflection light deviation amount detection unit.

9 Claims, 23 Drawing Sheets

$\delta_{\theta 0} = 2 t_c \cdot \theta$ $\delta_{d0} = 0$

TRACKING DIRECTION

TRACKING DIRECTION

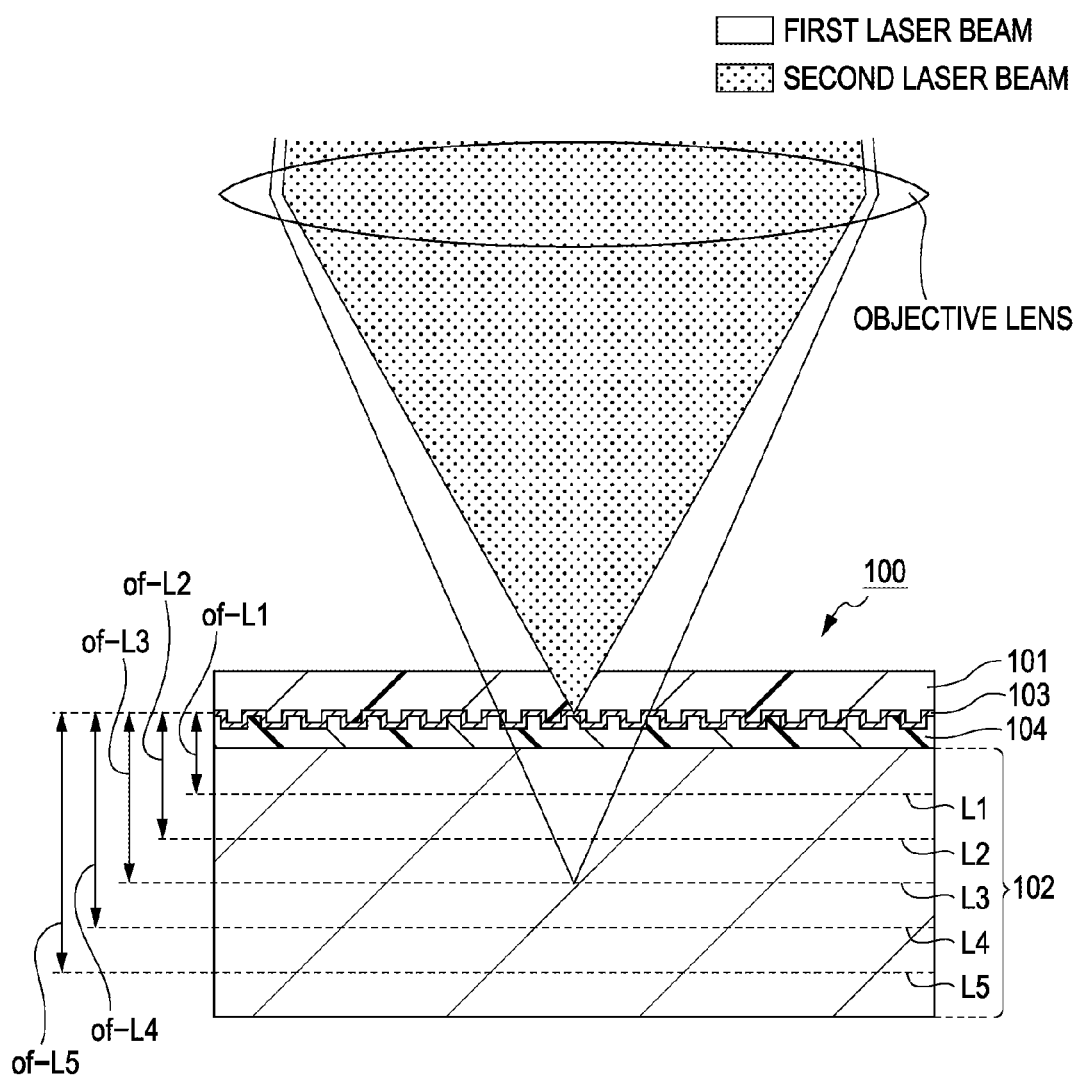

OPTICAL DRIVE DEVICE AND TILT DETECTION METHOD

BACKGROUND OF THE INVENTION

1. Field of the Invention

The present invention relates to an optical drive device for performing information recording or reproduction of recorded information by formation of a mark by focusing a first light at a necessary position in a recording layer of an optical recording medium by an objective lens and, more particularly, to an optical drive device for focusing a second light on a reflection film, in which a position guide element of the optical recording medium is formed, through the objective lens and enabling a spot position of the second light to follow the position guide element based on the reflected light of the second light focused on the reflection film so as to control the position of the objective lens, and a tilt detection method of such an optical drive device.

2. Description of the Related Art

As an optical recording medium for recording/reproducing a signal by irradiating a light, for example, a so-called optical disc such as a Compact Disc (CD), Digital Versatile Disc (DVD) or Blu-ray Disc (BD) (registered trademark) have come into wide use.

With respect to an optical recording medium which is a next-generation optical recording medium widely used in the present state of the CD, the DVD, the BD and the like, first, the present applicant proposes a so-called bulk recording type optical recording medium described in Japanese Unexamined Patent Application Publication No. 2008-135144 or 2008-176902.

Here, bulk recording indicates, for example, a technology of realizing a large amount of recording capacity by irradiating a laser beam to an optical recording medium (bulk type recording medium 100) having at least a cover layer 101 and a bulk layer (recording layer) 102 by sequentially changing a focusing position so as to perform multi-layer recording in the bulk layer 102, as shown in FIG. 20.

In such bulk recording, Japanese Unexamined Patent Application Publication No. 2008-135144 discloses a recording technology which is called a so-called micro hologram method.

The micro hologram method is divided into a positive type micro hologram method and a negative type micro hologram method, as shown in FIGS. 21A and 21B.

In the micro hologram method, a so-called hologram recording material is used as a recording medium of the bulk layer 102. As the hologram recording medium, for example, a photopolymerizable photopolymer or the like is widely known.

As shown in FIG. 21A, the positive type micro hologram method is a method of focusing two opposing light fluxes (light flux A and light flux B) at the same position so as to form a minute interference fringe (hologram) and using the minute interference fringe as a recording mark.

The negative type micro hologram method shown in FIG. 21B is a method of erasing an interference fringe formed in advance by laser beam irradiation and using the erased portion as a recording mark, in opposition to the positive type micro hologram method.

FIGS. 22A and 22B are diagrams illustrating the negative type micro hologram method.

In the negative type micro hologram method, before performing a recording operation, as shown in FIG. 22A, an initialization process for forming an interference fringe in the bulk layer 102 is performed in advance. In detail, as shown in the drawing, light fluxes C and D by parallel lights are oppositely irradiated so as to form such an interference fringe in the overall bulk layer 102.

After the interference fringe is formed in advance by the initialization process, as shown in FIG. 22B, information recording is performed by forming an erasing mark. In detail, by irradiating a laser beam according to recording information in a state of focusing on an arbitrary layer position, information recording by the erasing mark is performed.

The present applicant proposes, for example, a recording method of forming a void (hole) disclosed in Japanese Unexamined Patent Application Publication No. 2008-176902 as a recording mark, as a bulk recording method different from the micro hologram method.

The void recording method is, for example, a method of irradiating a laser light beam to the bulk layer 102 formed of a recording material such as a photopolymerizable photopolymer with relatively high power so as to record a hole (void) in the bulk layer 102. As described in Japanese Unexamined Patent Application Publication No. 2008-176902, the formed hole portion has a refractive index different from that of the other portion of the bulk layer 102 and thus the light reflection ratio of the boundary portion thereof is increased. Accordingly, the hole portion functions as a recording mark and thus information recording by formation of a hole mark is realized.

In such a void recording method, since the hologram is not formed, recording is completed by light irradiation from one side. That is, as in the positive type micro hologram method, it is not necessary to focus two light fluxes at the same position so as to form the recording mark.

In addition, in the comparison with the negative type micro hologram method, there is a merit that the initialization process is not performed.

Although, in Japanese Unexamined Patent Application Publication No. 2008-176902, an example of irradiating a pre-cure light before recording at the time of performing void recording is described, void recording is possible even when the irradiation of the pre-cure light is omitted.

However, even in the bulk recording type (simply also called bulk type) optical recording medium in which the above various recording methods are proposed, the recording layer (bulk layer) of the bulk type optical recording medium does not have an explicit multilayer structure in the sense that, for example, a plurality of reflection films is formed. That is, in the bulk layer 102, a reflection film and a guide groove of every recording layer included in a general multilayer disc are not provided.

Accordingly, in the structure of the bulk type recording medium 100 shown in FIG. 20, focus servo or tracking servo is not performed during recording in which the mark is not formed.

Accordingly, practically, in the bulk type recording medium 100, a reflection surface (reference surface) which becomes a reference having guide grooves shown in FIG. 23 is provided.

In detail, the guide grooves such as pits or grooves are formed in a lower surface side of the cover layer 101 and a selective reflection film 103 is formed thereon. The bulk layer 102 is laminated on the lower layer side of the cover layer 101, on which the selective reflection film 103 is formed, with an adhesive material interposed therebetween as an intermediate layer 104 of the drawing, such as a UV curing resin.

After such a medium structure is formed, as shown in FIG. 24, a second laser beam is irradiated to the bulk type recording medium 100 as a position control laser beam, separately from a laser beam (first laser beam) for recording (or reproducing) a mark.

As shown, the first laser beam and the second laser beam are irradiated to the bulk type recording medium 100 through a common objective lens.

At this time, if the second laser beam reaches the bulk layer 102, the mark recording in the bulk layer 102 may be adversely affected. Accordingly, in the bulk recording method of the related art, the laser beam having a wavelength range different from that of the first laser beam is used as the second laser beam, and the selective reflection film 103 having wavelength selectivity, which reflects the second laser beam and transmits the first laser beam is provided as the reflection film formed on the guide groove forming surface (reference surface).

On the above assumption, the operation at the time of mark recording will be described with reference to FIG. 24.

First, when multilayer recording is performed with respect to the bulk layer 102 in which the guide grooves or the reflection film is not formed, the layer position for recording the mark in a depth direction in the bulk layer 102 is set in advance. In the drawing, the case where a total of 5 information recording layers (mark forming layers) L including a first information recording layer L1 to a fifth information recording layer L5 is set as a layer position (mark forming layer; also called an information recording layer) for forming the mark in the bulk layer 102 is shown. As shown, the layer position of the first information recording layer L1 is set to a position separated by a first offset of-L1 in a focus direction (depth direction) from the selective reflection film 103 (reference surface) in which the guide grooves are formed. The layer position of the second information recording layer L2, the layer position of the third information recording layer L3, the layer position of the fourth information recording layer L4 and the layer position of the fifth information recording layer L5 are set to positions separated from the selective reflection film 103 by a second offset of-L2, a third offset of-L3, a fourth offset of-L4 and a fifth offset of-L5, respectively.

During recording in which the mark is not yet formed, focus servo and tracking servo are not performed based on the layer positions in the bulk layer 102 with respect to the reflected light of the first laser beam as a target. Accordingly, the focus servo control and the tracking servo control of the objective lens during recording are performed so as to enable the spot position of the second laser beam to follow the guide grooves on the selective reflection film 103 based on the reflected light of the second laser beam as the position control beam.

It is necessary for the first laser beam which is the mark recording beam to reach the bulk layer 102 formed on the lower layer side of the selective reflection film 103. Accordingly, in an optical system of this case, a first laser focus mechanism for independently adjusting a focusing position of the first laser beam separately from the focus mechanism of the objective lens is provided.

As the first laser focus mechanism, an expander for changing collimation of the first laser beam incident to the objective lens or the like may be realized.

During recording, when mark recording is performed with respect to a necessary information recording layer L among the information recording layers L set in advance, the first laser focus mechanism is controlled so as to change the focusing position of the first laser beam by an offset "of" corresponding to the selected information recording layer L. In the drawing, the case where the third information recording layer L3 is selected as the information recording layer L to be recorded and, in correspondence therewith, the focusing position of the first laser beam is changed from the selective reflection film 103 by the third offset of-L3 is shown.

As described above, the focus servo control of the objective lens is performed so as to follow the selective reflection film 103 based on the reflected light of the second laser beam. Accordingly, it is possible to realize a certain focus servo (follow-up to surface wobbling or the like) to the first laser beam.

In regard to the tracking servo of the first laser beam during recording, as described above, the tracking servo control of the objective lens is automatically performed so as to follow the guide grooves based on the reflected light of the second laser beam. In detail, the spot position of the first laser beam is controlled to the position which is a position beneath the guide grooves in the bulk layer 102.

Although not shown, since a mark string is formed in the bulk layer 102 during reproduction, it is not necessary to the position of the objective lens based on the reflected light of the second laser beam, like during recording. That is, during reproduction, the focus servo control and the tracking servo control of the objective lens is performed based on the reflected light of the first laser beam with respect to the mark string formed on the information recording layer L to be reproduced.

As described above, in the bulk recording method, the first laser beam as the mark recording/reproduction light and the second laser beam as the position control light are irradiated to the bulk type recording medium 100 through a common objective lens (by synthesis on the same optical axis). Thereafter, by performing control such that the position of the objective lens follows the guide grooves based on the reflected light of the second laser beam, the spot position of the tracking direction of the first laser beam follows the position beneath the guide grooves even when the guide grooves are not formed in the bulk layer 102.

However, as disclosed in Japanese Unexamined Patent Application Publication No. 2008-71435, when a so-called tilt is generated, the spot position of the first laser beam is shifted from the spot position of the second laser beam.

That is, when the tilt is generated, since the bulk type recording medium 100 is not perpendicular to the common optical axis of the second laser beam and the first laser beam, the spot position of the first laser beam in the bulk layer 102 is not a position beneath the guide grooves, which the spot position of the second laser light follows, and thus a deviation therebetween is generated.

In Japanese Unexamined Patent Application Publication No. 2008-71435 discloses a technology of correcting the deviation between the spot positions of the first laser beam and the second laser beam by such a tilt.

In the related art, as disclosed as a second embodiment (FIGS. 17A and 17B) of Japanese Unexamined Patent Application Publication No. 2008-71435, tilt (slope angle) detection using a tilt sensor 165 is performed so as to correct the deviation between the spot positions.

As described in Japanese Unexamined Patent Application Publication No. 2008-71435, the tilt sensor 165 is configured to irradiate a sensor light beam so as to form a predetermined angle with respect to an optical disc 200 by a laser diode 167 provided for tilt detection and to detect the slope angle based on the result of detecting the spot position of the reflected light capable of being obtained from the optical disc by a photodetector 168.

SUMMARY OF THE INVENTION

However, in the correction method of the related art disclosed in Japanese Unexamined Patent Application Publication No. 2008-71435, the tilt sensor 165 is provided separately from an optical system for mark recording/reproduction or position control and thus a separate light source is necessary. That is, since it is necessary for the tilt sensor 165 to irradiate the sensor light beam so as to form the predetermined angle with respect to the optical disc and to receive the reflected light thereof as described above, an optical system different from the optical system for recording/reproduction or server is assembled.

Accordingly, it is necessary to secure a space, in which the tilt sensor 165 is mounted, outside the optical system for recording/reproduction or position control. Thus, it is disadvantageous in terms of device miniaturization.

In the present invention, an optical drive device has the following configuration.

That is, an optical drive device according to an embodiment of the present invention is an optical drive device for performing information recording or reproduction of recorded information by formation of a mark by focusing a first light at a necessary position in a recording layer of an optical recording medium by an objective lens, which includes a position control unit configured to focus a second light on a reflection film, in which a position guide element of the optical recording medium is formed, through the objective lens and to enable the spot position of the second light to follow the position guide element based on the reflected light of the second light focused on the reflection film so as to control the position of the objective lens.

The optical drive device includes a first focusing unit configured to focus the reflected light from the optical recording medium of the second light incident through the objective lens by irradiating the second light to the optical recording medium, and a first light-sensing portion disposed such that a spot of the reflected light from a surface of the optical recording medium included in the reflected light of the second light focused by the first focusing unit is formed on a light-sensing surface thereof.

In addition, the optical drive device includes a surface reflection light deviation amount detection unit configured to detect a deviation amount from a reference position in the light-sensing surface of the spot of the reflected light from the surface, based on a light-sensing signal by the first light-sensing portion.

As described below, when the first light-sensing portion senses the reflected light from the surface of the optical recording medium of the second light (position control light), the deviation amount from the reference position in the light-sensing surface of the light-sensing position is caused due to a tilt amount.

Therefore, according to the embodiment of the present invention, it is possible to perform the detection of the tilt amount, and, more particularly, the detection of the deviation amount of the first light (recording/reproducing light) relative to the spot position of the second light generated due to the tilt.

At this time, according to the embodiment of the present invention, the detection of the tilt amount (the spot deviation amount due to the tilt) may be performed using the second light as the position control light without providing a separate light source as in a tilt sensor of the related art. That is, an optical system for tilt detection of this case may be assembled in an optical system for mark recording/reproduction or position control.

Therefore, according to the embodiment of the present invention, it is possible to perform the detection of the tilt amount, and, more particularly, the detection of the deviation amount of the spot position of the first light (recording/reproducing light) relative to the spot position of the second light (the position control light) generated due to the tilt, using the reflected light of the second light and to assemble an optical system for tilt detection in an optical system for mark recording/reproduction or position control.

Accordingly, as in the case of using a tilt sensor of the related art, it is unnecessary to provide an optical system separately from a light source for mark recording/reproduction or position control and thus it is unnecessary to secure a space of an optical system for tilt detection outside the optical system for mark recording/reproduction or position control.

As a result, according to the embodiment of the present invention, it is possible to reduce device manufacturing cost or realize device miniaturization, by reducing the number of parts as compared with the related art.

BRIEF DESCRIPTION OF THE DRAWINGS

FIG. 24 is a diagram illustrating an operation at the time of mark recording on a bulk type recording medium.

DESCRIPTION OF THE PREFERRED EMBODIMENTS

Hereinafter, the best modes (hereinafter, referred to as embodiments) for carrying out the invention will be described. The description will be given in the following order.

<1. Example of Optical Recording Medium for Recording/Reproduction>

<2. Regarding Servo Control during Recording/Reproduction>

<3. First Embodiment: Detection Correction of Spot Deviation due to Tilt>

[3-1. Method of Detecting Spot Deviation Amount due to Tilt]

[3-2. Detailed Configuration for Detecting Deviation Amount]

[3-3. Configuration of Optical Drive Device of First Embodiment]

<4. Second Embodiment: Detection Correction of Spot Deviation Including Spot Deviation due to Lens Shift>

[4-1. Method of Detecting Spot Deviation Amount due to Lens Shift]

[4-2. Detailed Configuration for Detecting Deviation Amount]

[4-3. Configuration of Optical Drive Device of Second Embodiment]

<5. Modified Example>

1. Example of Optical Recording Medium for Recording/Reproduction

Figure 1:
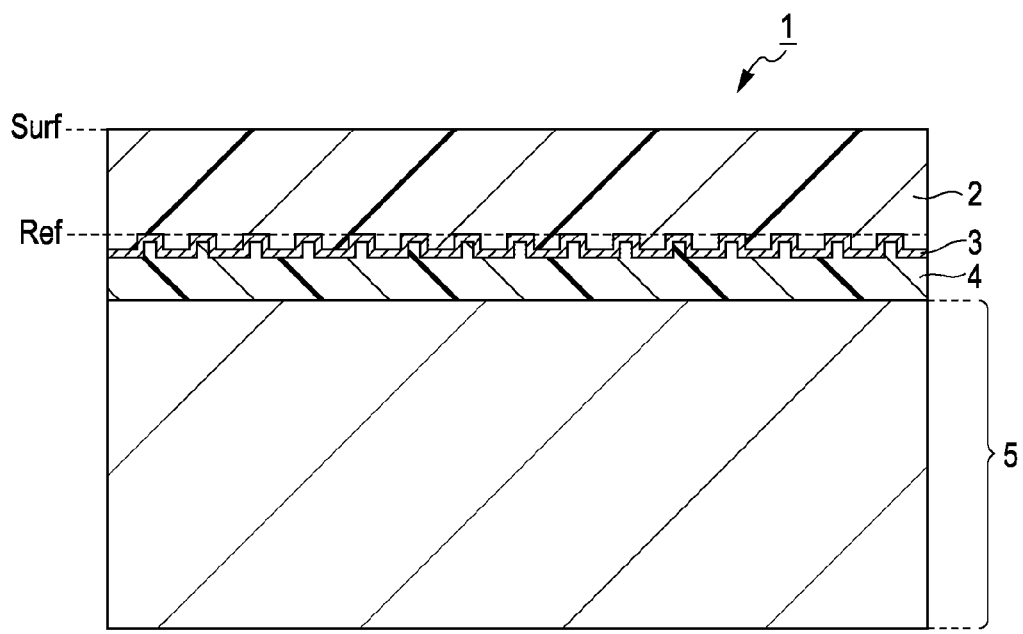
FIG. 1 is a cross-sectional structural view of an optical recording medium for recording/reproduction according to an embodiment.

FIG. 1 is a cross-sectional structural view of an optical recording medium for recording/reproduction according to an embodiment.

In the embodiment, the optical recording medium for recording/reproduction is a so-called bulk recording type optical recording medium and is hereinafter referred to as a bulk type recording medium 1.

The bulk type recording medium 1 is a disc-shaped optical recording medium, which irradiates a laser beam to the rotated and driven bulk recording medium 1 so as to perform mark recording (information recording). Reproduction of recorded information is performed by irradiating a laser beam to the rotated and driven bulk type recording medium 1.

The optical recording medium indicates a recording medium for reproducing the recorded information by light irradiation.

As shown in FIG. 1, in the bulk type recording medium 1, a cover layer 2, a selective reflection film 3, an intermediate layer 4, and a bulk layer 5 are sequentially formed from an upper layer side.

In the present specification, the "upper layer side" indicates an upper layer side when a surface, to which a laser beam from the side of an optical drive device (a recording/reproducing device 10 or a recording/reproducing device 60) as the below-described embodiment is incident, is an upper surface.

Although the term "depth direction" is used in the present specification, the term "depth direction" indicates a direction matched to a vertical direction according to the definition of the "upper layer side" (that is, a direction parallel to the incident direction of the laser beam from the optical drive device side: focus direction).

In the bulk type recording medium 1, the cover layer 2 is formed of, for example, resin such as polycarbonate or acrylic and, as shown, a cross-sectional shape of irregularities according to formation of guide grooves for guiding a recording/reproduction position on a lower surface side thereof.

As the guide grooves, consecutive grooves or pit rows are formed. For example, if the guide grooves are formed of pit rows, position information (absolute position information: for example, rotation angle information, radius position information, or the like) is recorded by a combination of the lengths of pits and lands. Alternatively, if the guide grooves are formed of grooves, the grooves are periodically formed in a zigzag (wobble) manner so as to record position information by periodic information of the zigzag.

The cover layer 2 is generated by injection molding or the like using a stamper in which such guide grooves are formed (irregular shape).

The selective reflection film 3 is formed on a lower surface side of the cover layer 2, in which the guide grooves are formed.

As described above, in a bulk recording method, a servo light (also called a position control light or a second laser beam) for obtaining a tracking or focus error signal based on the above guide grooves is irradiated separately from a recording light (first laser beam) for performing mark recording with respect to the bulk layer 5 as a recording layer.

At this time, if the servo light reaches the bulk layer 5, the mark recording in the bulk layer 5 may be adversely affected. Accordingly, a reflection film having selectivity for reflecting the servo light and transmitting the recording light is necessary.

In the bulk recording method of the related art, a laser beam having a wavelength range different from those of the recording light and the servo light is used and, in correspondence therewith, a selective reflection film having wavelength selectivity, which reflects a light having the same wavelength range as the servo light and transmits a light having the other wavelength range, is used as the selective reflection film 3.

The bulk layer 5 as the recording layer is laminated (adhered) on the lower layer side of the selective reflection film 3 with the intermediate layer 4 interposed therebetween, which is formed of, for example, an adhesive material such as UV curing resin.

As the material (recording material) of the bulk layer 5, an optimal material is appropriately employed, for example, according to the employed bulk recording method such as the above-described positive type micro hologram method, the negative type micro hologram method, the void recording method.

In the embodiment of the present invention, it is desirable to detect a spot position deviation between the position control light and the recording light generated by a tilt in the case where information recording or reproduction of recorded information by mark formation is performed by focusing a first light at a necessary position in a recording layer of an optical recording medium by an objective lens, a second light is focused on a reflection film, in which a position guide element of the optical recording medium is formed, through an objective lens, and the position of the objective lens is controlled such that the spot position of the second light follows the position guide element based on the reflected light of the second light focused on the reflection film.

From this viewpoint, the mark recording method of the optical recording medium of the embodiment of the present invention is not specially limited and a certain method may be employed in the range of the bulk recording method.

In the bulk type recording medium 1 having the above configuration, the surface of the upper layer side of the cover layer 2 becomes a surface Surf of the bulk type recording medium 1.

In addition, the selective reflection film 3 having the irregular shape according to the guide grooves of the lower surface side of the cover layer 2 becomes a reflection surface which is a reference used in the position control of the first laser beam based on the second laser beam, as described below. In this sense, the surface on which the selective reflection film 3 is formed is hereinafter referred to as a reference surface Ref.

2. Regarding Servo Control during Recording/Reproduction

Subsequently, servo control during recording/reproduction of the bulk type recording medium 1 will be described with reference to FIGS. 2 and 3.

Figure 2:
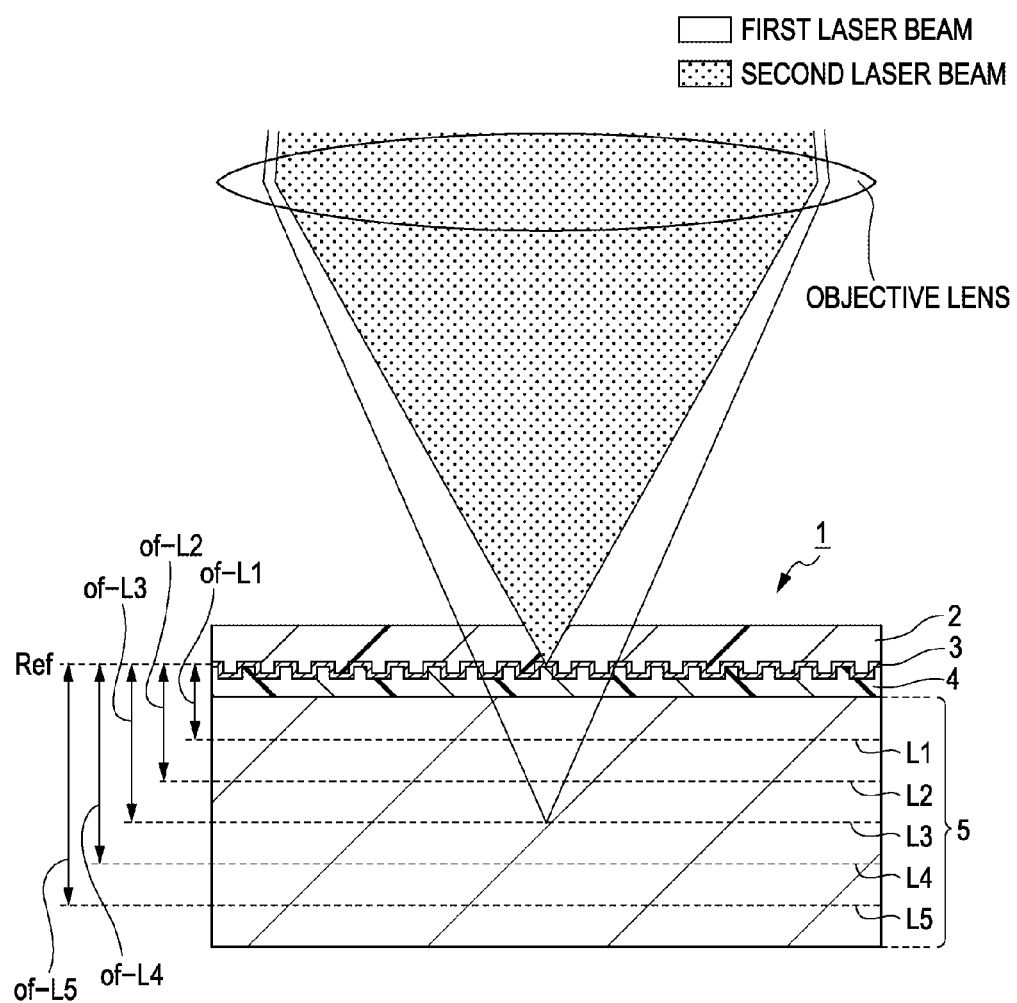
FIG. 2 is a diagram illustrating servo control during recording.
Figure 3:
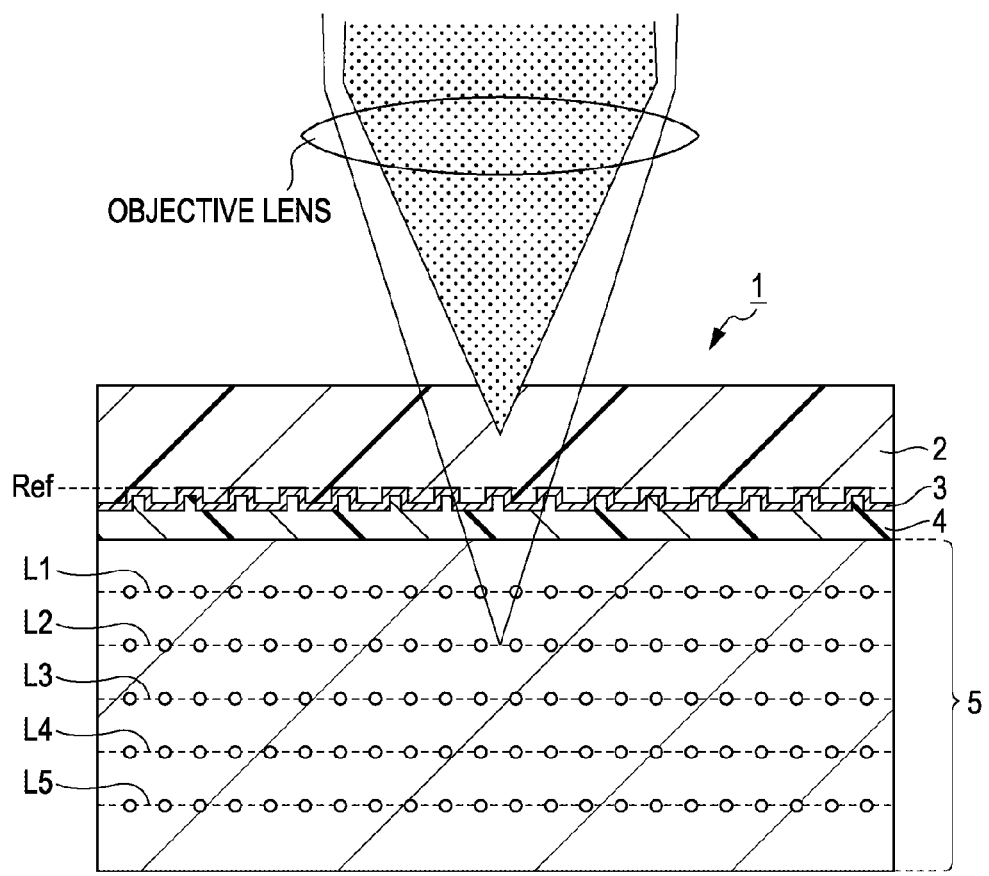
FIG. 3 is a diagram illustrating servo control during reproduction.

FIG. 2 is a diagram illustrating servo control during recording, and FIG. 3 is a diagram illustrating servo control during reproduction.

First, in FIG. 2, as described above, a laser beam (first laser beam) for forming a recording mark and performing information reproduction from the recording mark and a laser beam (second laser beam) as a servo light having a wavelength range different from that of the first laser beam are irradiated to the bulk type recording medium 1.

Figure 11:
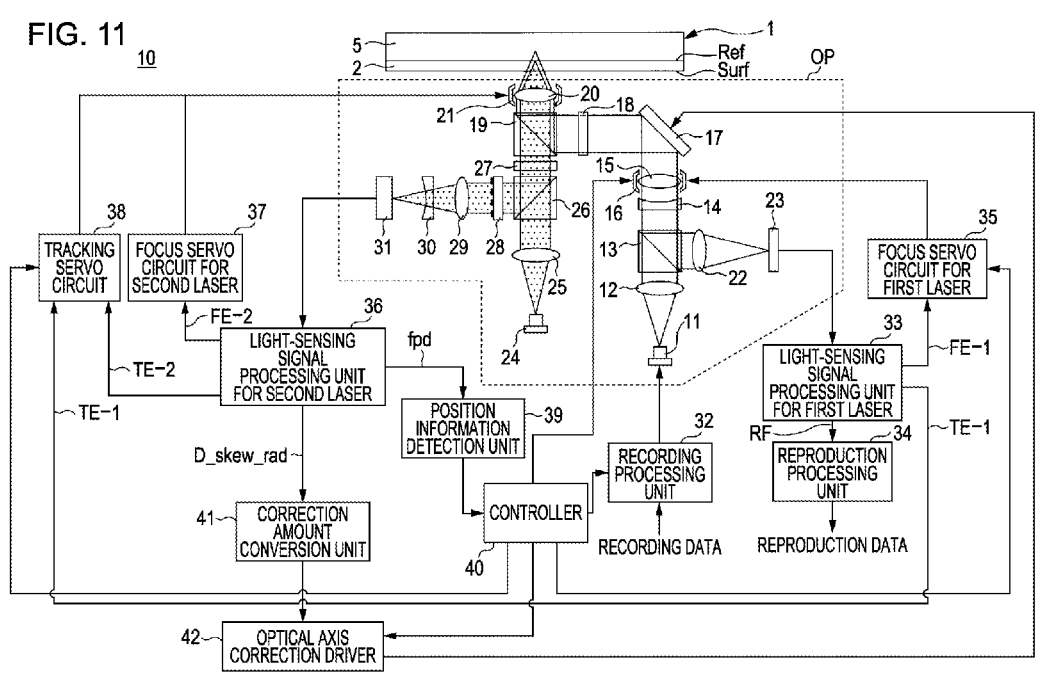
FIG. 11 is a diagram showing the internal configuration of an optical drive device according to a first embodiment.

As shown, the first laser beam and the second laser beam are irradiated to the bulk type recording medium 1 through a common objective lens (an objective lens 20 of FIG. 11).

As shown in FIG. 1, in the bulk layer 5, for example, unlike a multilayer disc for the present optical disc such as a Digital Versatile Disc (DVD) or a Blu-ray Disc (BD) (registered trademark), a reflection surface having guide grooves due to pits or grooves is not formed at each layer position to be recorded. Accordingly, during recording in which the mark is not yet formed, focus servo or tracking servo of the first laser beam is not performed using the reflected light of the first laser beam.

From this viewpoint, during recording of the bulk type recording medium 1, both tracking servo and focus servo of the first laser beam are performed using the reflected light of the second laser beam as the servo light.

In detail, in regard to the focus servo of the first laser beam during recording, first, a focus mechanism for the first laser beam (lenses 14 and 15 and a lens driving unit 16 of FIG. 11) for independently changing only the focusing position of the first laser beam are provided and the focus mechanism for the first laser beam is then controlled based on an offset "of" shown in the drawing using the selective reflection film 3 (reference surface Ref) as a reference.

Here, as described above, the first laser beam and the second laser beam are irradiated to the bulk type recording medium 1 through the common objective lens. The focus servo of the second laser beam is performed by controlling the objective lens using the reflected light from the reference surface Ref (selective reflection film 3) of the second laser beam.

The first laser beam and the second laser beam are irradiated through the common objective lens and the focus servo of the second laser beam is performed by the controlling the objective lens based on the reflected light from the reference surface Ref of the second laser beam such that the focusing position of the first laser beam follows the surface variation of the bulk type recording medium 1.

Thereafter, using the focus mechanism for the first laser beam, the focusing position of the first laser beam is offset by the value of the offset "of". Accordingly, the focusing position of the first laser beam follows a necessary depth position in the bulk layer 5.

In the drawing, as the example of the offsets "of" corresponding to the case where 5 mark forming layers (also called an information recording layer) L are set in the bulk layer 5, the case where a first offset of-L1 corresponding the layer position of a first information recording layer L1, a second offset of-L2 corresponding to the layer position of a second information recording layer L2, a third offset of-L3 corresponding to the layer position of a third information recording layer L3, a fourth offset of-L4 corresponding to the layer position of a fourth information recording layer L4 and a fifth offset of-L5 corresponding to the layer position of a fifth information recording layer L5 are set is shown. By driving the focus mechanism for the first laser beam using the value of the offset "of", the mark forming position (recording position) in a depth direction may be adequately selected from the layer position as the first information recording layer L1, the layer position as the second information recording layer L2, the layer position as the third information recording layer L3, the layer position as the fourth information recording layer L4 and the layer position as the fifth information recording layer L5.

In regard to the tracking servo of the first laser beam during recording, as described above, the tracking servo control of the objective lens using the reflected light of the second laser beam from the reference surface Ref is performed using the point that the first laser beam and the second laser beam are irradiated through the common objective lens.

Subsequently, the servo control during reproduction shown in FIG. 3 will be described.

In FIG. 3, a state in which recording of a mark string is completed in the first information recording layer L1 to the fifth information recording layer L5 is shown as the state of the bulk type recording medium 1 during reproduction.

During reproduction of the bulk type recording medium 1 in which the mark string is already formed, the focus servo control of the first laser beam may be performed with respect to the recorded mark string. Accordingly, the focus servo control of the first laser beam during reproduction is performed by controlling the above-described focus mechanism for the first laser beam based on the reflected light of the first laser beam such that the focusing position follows the mark string (information recording layer L) to be reproduced.

The focus servo control of the second laser beam is performed by controlling the position of the focus direction of the objective lens so as to follow the reference surface Ref based on the reflected light of the second laser beam, in order to read the absolute position information of the second laser beam.

The tracking servo (control of the tracking direction of the objective lens) during reproduction is changed before and after the completion of access to a reproduction start position. That is, since it is necessary for the absolute position information recorded in the reference surface Ref to be readable until the access operation to the reproduction start position is completed, it is necessary for the spot position of the second laser beam to follow the guide grooves. In contrast, after the access operation is completed, in order to reproduce the information recorded in the bulk layer 5 using the first laser beam, it is necessary for the spot position of the first laser beam to follow the mark string.

Based on such a point, the position control of the tracking direction of the objective lens during reproduction is performed so as to follow the guide grooves in the reference surface Ref based on the reflected light of the second laser beam before the access is completed and is performed so as to follow the mark string to be reproduced based on the reflected light of the first laser beam after the access is completed.

In summary, the servo control of the first laser beam and the second laser beam during recording/reproduction in this case is performed as follows.

During Recording

The focus servo of the first laser beam is performed by changing the focusing position of the first laser beam by the offset "of" according to the information recording layer L to be recorded by the focus mechanism for the first laser beam, under the control of the position of the focus direction of the objective lens with respect to the reference surface Ref based on the reflected light of the second laser beam.

(The tracking servo of the first laser beam during recording is automatically performed by the position control of the tracking direction of the objective lens based on the reflected light of the second laser beam.)

The focus servo of the second laser beam is performed by controlling the focus direction position of the objective lens so as to follow the reference surface Ref based on the reflected light of the second laser beam.

The tracking servo of the second laser beam is performed by controlling the tracking direction position of the objective lens so as to follow the guide grooves in the reference surface Ref based on the reflected light of the second laser beam.

During Reproduction

The tracking servo control of the objective lens is performed such that the spot of the second laser beam follows the guide grooves of the reference surface Ref based on the reflected light of the second laser beam before the access is completed and is performed such that the spot of the first laser beam follows the mark string to be reproduced based on the reflected light of the first laser beam after the access is completed.

The focus servo is performed by controlling the focus mechanism for the first laser beam based on the reflected light of the first laser beam so as to follow the mark string with respect to the first laser beam and is performed by controlling the focus direction position of the objective lens based on the reflected light of the second laser beam so as to follow the reference surface Ref with respect to the second laser beam.

3. First Embodiment

Detection Correction of Spot Deviation Due to Tilt

[3-1. Method of Detecting Spot Deviation Amount Due to Tilt]

Here, as can be understood from the above description, in the present embodiment, in the bulk type recording medium 1, information recording or reproduction of recorded information is performed by formation of the mark by focusing the first light at the necessary position in the recording layer of the optical recording medium by the objective lens, and the second light is focused on the reflection film in which the position guide element of the optical recording medium is formed through the objective lens and the position of the objective lens is controlled such that the spot position of the second light follows the position guide element based on the reflected light of the second light focused on the reflection film.

As described above, in the case where the method of realizing the tracking servo control of the first laser beam by the tracking servo control of the common objective lens based on the reflected light of the second laser beam is employed, since the bulk type recording medium 1 is not perpendicular to the common optical axis of the second laser beam and the first laser beam due to the generation of the tilt, the spot position of the first laser beam in the bulk layer 5 is not positioned beneath the guide grooves which the spot position of the second laser beam follows and thus a spot position deviation between the first laser beam and the spot position of the second laser beam is generated.

Although the technology using the tilt sensor 165 is disclosed in Japanese Unexamined Patent Application Publication No. 2008-71435 as the technology of correcting the relative spot position deviation between the first laser beam and the second laser beam due to such a tilt, as described above, the tilt sensor 165 has to have a light source which is provided separately with the optical system for mark recording/reproducing or servo. Thus, since it is necessary to secure the space, in which the tilt sensor is mounted, outside the optical system for recording/reproduction or servo, it is disadvantageous in terms of reduction of device manufacturing cost or miniaturization.

Accordingly, in the present embodiment, by the below-described tilt detection method using a position control light, the addition of a separate light source is not necessary, device manufacturing cost is reduced, and miniaturization is realized.

Figure 4A:
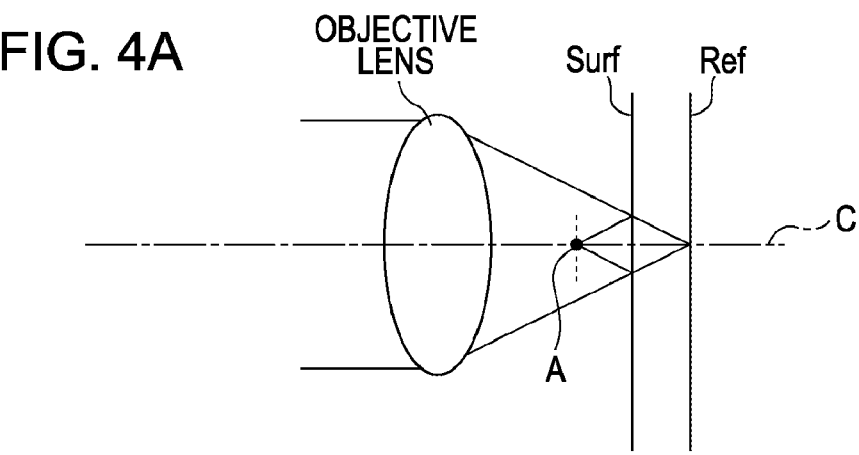
FIGS. 4A and 4B are diagrams illustrating a tilt detection method according to an embodiment.
Figure 4B:
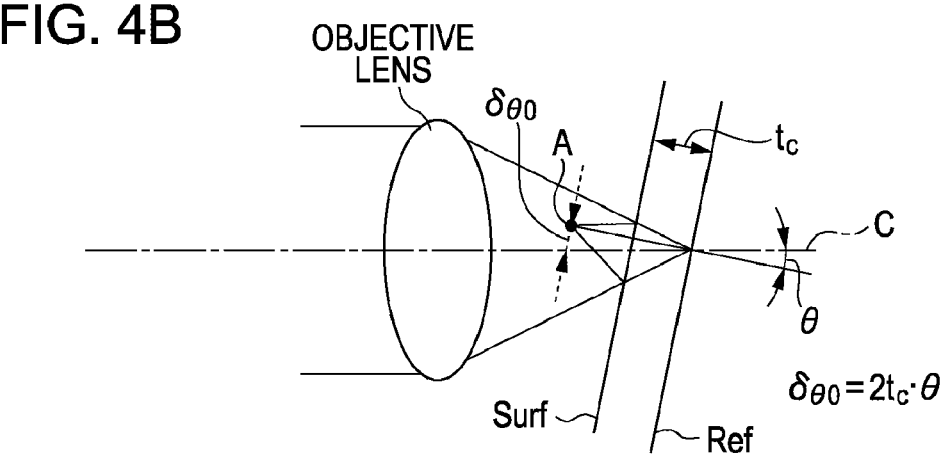

FIGS. 4A and 4B are diagrams illustrating a tilt detection method according to an embodiment.

In FIGS. 4A and 4B, FIGS. 4A and 4B show a relationship among the second laser beam irradiated through the objective lens, the surface Surf of the bulk type recording medium 1, and the reference surface Ref, wherein FIGS. 4A and 4B shows a state in which a tilt is not present and FIG. 4B shows a state in which a tilt is present.

In FIGS. 4A and 4B, in the present embodiment, as shown, a deviation amount of a focal point A of the reflected light from the surface Surf of the second laser beam irradiated to the bulk type recording medium 1 through the objective lens so as to detect a tilt generation amount and a spot position deviation amount between the first laser beam and the second laser beam due to the tilt.

Here, as shown in FIG. 4A, in the state in which the tilt is not generated, the bulk type recording medium 1 is perpendicular to the optical axis (center) C of the second laser beam (an angle between the optical axis C and the surface Surf or the reference surface Ref is 90°) and the focal point A of the reflected light from the surface Surf is obtained on the optical axis C of the second laser beam.

In contrast, as shown in FIG. 4B, if the tilt is generated such that the bulk type recording medium 1 is tilted from the state shown in FIG. 4A by θ°, the focal point A is obtained from a position shifted from the optical axis C of the second laser beam.

Here, as shown, if a distance between the surface Surf of the bulk type recording medium 1 and the reference surface Ref is $t_c$, the deviation amount $\delta_{\theta 0}$ from the optical axis C due to the tilt of the focal point A is expressed by Equation 1

$\delta_{\theta 0} = 2t_c \cdot \theta$  Equation 1

Figure 5:
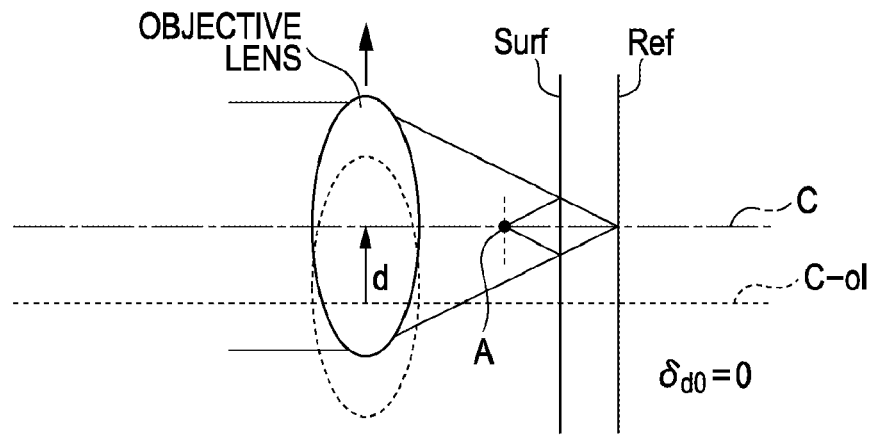
FIG. 5 is a diagram showing a state of a focal point A when lens shift of an objective lens is generated.

FIG. 5 is a diagram showing a state of a focal point A when lens shift of an objective lens is generated.

For confirmation, lens shift indicates that, as the objective lens is moved in a tracking direction (a radius direction of the bulk type recording medium 1) due to tracking servo control or the like, the object lens is shifted such that the center thereof is deviated from a central reference position C-ol of the objective lens set at the time of the design of the optical system in the tracking direction.

Although described in a second embodiment, the spot position deviation between the first laser beam and the second laser beam is generated by the lens shift of the objective lens as well as the tilt.

However, as shown in FIG. 5, the focal point A is positioned on the optical axis C of the second laser beam if the lens shift is generated. That is, the detection position of the focal point A is not changed in case of lens shift.

As can be understood from the above description, the deviation amount from the optical axis C of the focal point A of the reflected light from the surface Surf of the second laser beam is purely caused only by the tilt generation amount (spot position deviation amount due to the tilt).

[3-2. Detailed Configuration for Detecting Deviation Amount]

The detailed configuration for detecting the deviation amount of the focal point A will be described with reference to FIGS. 6 to 9.

Figure 6:
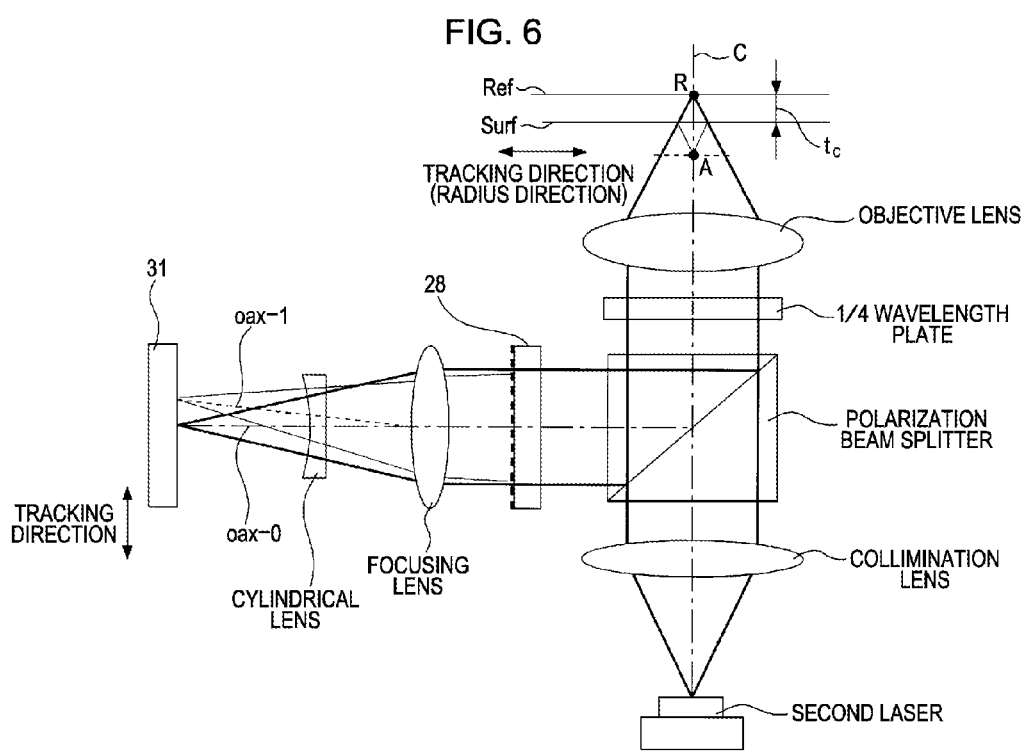
FIG. 6 is a diagram showing a configuration example of an optical system of a second laser beam for realizing deviation amount detection of a focal point A.

FIG. 6 is a diagram showing a configuration example of an optical system of a second laser beam for realizing deviation amount detection of the focal point A.

First, in this optical system, a second laser of the drawing is provided as a light source for the second laser beam. The second laser beam emitted from the second laser becomes a parallel beam by a collimation lens, transmits through a polarization beam splitter and enters the objective lens through a ¼ wavelength plate. The second laser beam incident to the objective lens is controlled by the focus servo control of the second laser beam so as to have the focal point on the reference surface Ref of the bulk type recording medium 1 as shown in the drawing.

The focal point of the second laser beam formed on the reference surface Ref is hereinafter referred to as a focal point R.

As the reflected light from the bulk type recording medium 1, the reflected light from the focal point R on the reference surface Ref and the reflected light from the surface Surf may be obtained.

The reflected light of the second laser beam from the bulk type recording medium 1 passes through the objective lens and the ¼ wavelength plate and reflects from the above-described polarization beam splitter so as to enter into a detection light separation Holographic Optical Element (HOE: hologram element) 28 of the drawing.

Then, the reflected light of the second laser beam passing through the detection light separation HOE 28 is converted into a convergent light by a focusing lens and the light converted into the convergent light is focused on a detection surface of a light-sensing portion 31 for a second laser through a cylindrical lens.

Here, the detection light separation HOE 28 transmits the reflected light from the bulk type recording medium 1 of the second laser beam incident from the polarization beam splitter as a 0-order light and generates and outputs a diffracted light at a position deviated in the tracking direction shown in the drawing.

Figure 7:
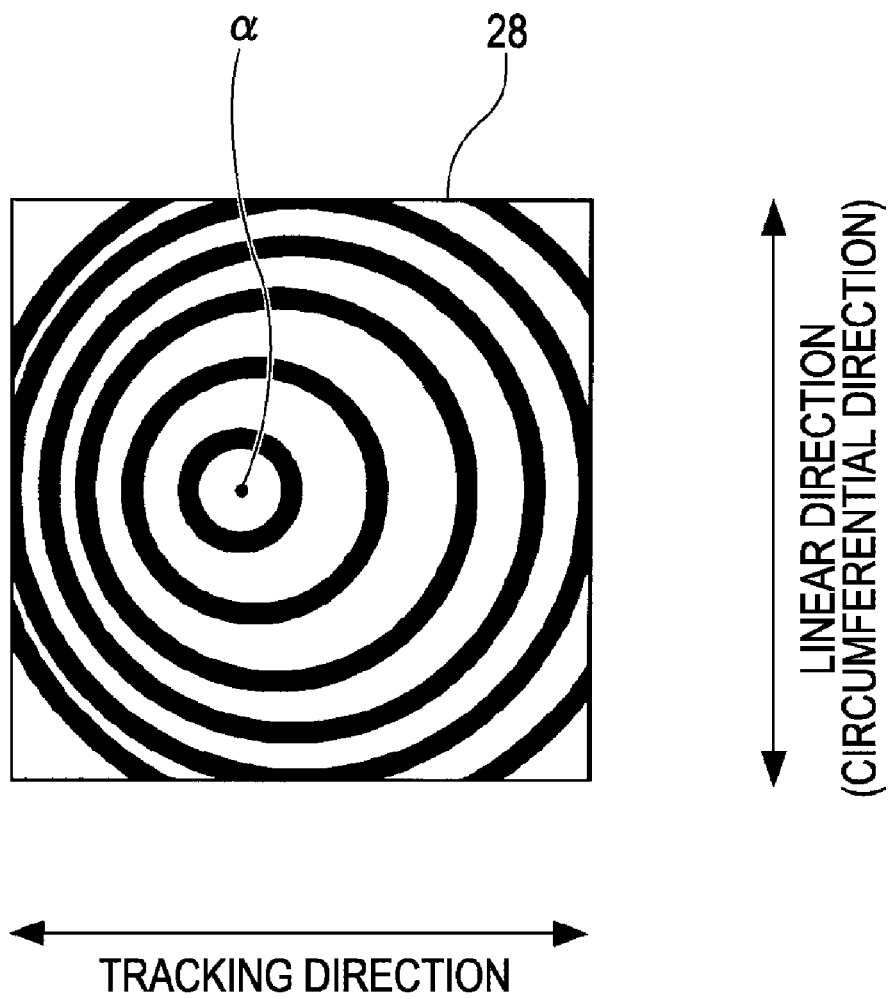
FIG. 7 is a diagram showing a hologram pattern set to a detection light separation HOE.

FIG. 7 is a diagram showing a hologram pattern set to the detection light separation HOE 28 for generating and outputting the diffracted light at the position deviated in the tracking direction as described above.

In FIG. 7, the tracking direction shown in FIG. 6 is shown. The direction perpendicular to the tracking direction is a linear direction (a circumferential direction of the bulk type recording medium 1).

As shown in FIG. 7, an eccentric hologram pattern is formed in the detection light separation HOE 28 and the center α of each circle is set to a position slanted to any one of the tracking directions. By such pattern setting, it is possible to output the diffracted light in the direction (in this case, the left direction of the paper) to which the center α is slanted in the tracking direction.

In FIG. 6, a 0-order light of the second laser light is denoted by a thick solid line and the diffracted light (first-order light) of the second laser beam output from the detection light separation HOE 28 is indicated by a thin solid line.

As shown, the optical axis (in the drawing, a dashed dotted line) of the 0-order light output from the detection light separation HOE 28 and focused on the light-sensing portion 31 for the second laser is "oax-0". In addition, the optical axis (in the drawing, a dotted line) of the 1-order light output from the detection light separation HOE 28 and focused at a position deviated from the focused position of the 0-order light of the light-sensing portion 31 for the second laser in the tracking direction is "oax-1".

Figure 8A:
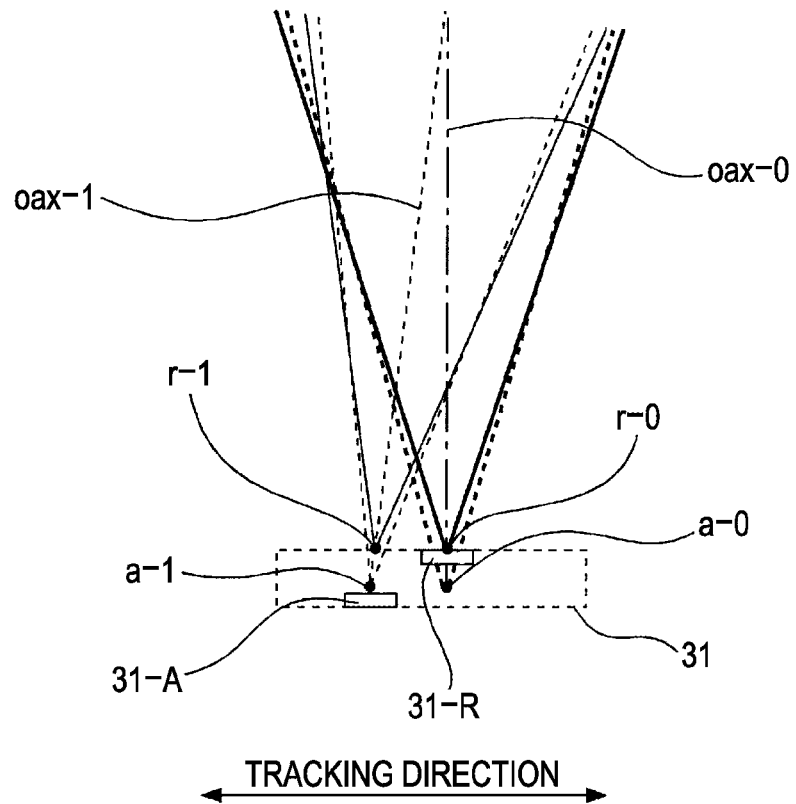
FIGS. 8A and 8B are diagrams illustrating a mount position of a light-sensing portion for a second laser included in an optical drive device according to a first embodiment, and the internal configuration thereof.
Figure 8B:
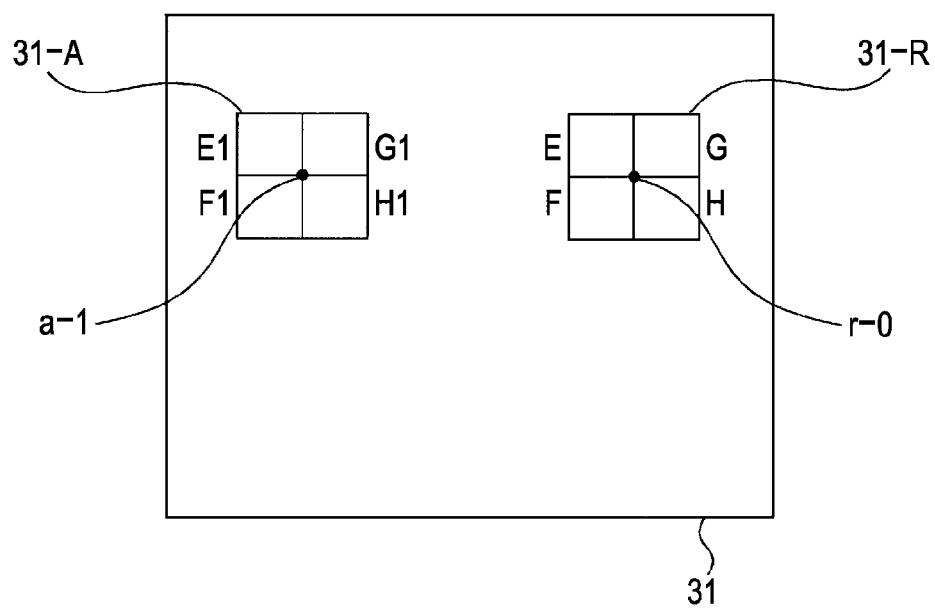

FIGS. 8A and 8B are diagrams illustrating the mount position of the light-sensing portion 31 for the second laser shown in FIG. 6 and the internal configuration thereof.

In FIGS. 8A and 8B, FIG. 8A shows the cross-sectional structure of the light-sensing portion 31 for the second laser and the state of the 0-order light (in the drawing, the thick line) and the 1-order light of the reflected light of the second laser light irradiated to the light-sensing portion 31 for the second laser. FIG. 8B is a plan view of a light-sensing surface (detection surface) of the light-sensing portion 31 for the second laser.

In FIGS. 8A and 8B, the left and right direction (horizontal direction) of the paper is the tracking direction shown in FIG. 6.

For confirmation, as can be seen from FIG. 6, the reflected lights (both the 0-order light and the 1-order light) of the second laser beam irradiated to the light-sensing portion 31 for the second laser include the reflected light component (the light from the focal point R) from the reference surface Ref and the reflected light component (the light from the focal point A) from the surface Surf.

In FIG. 8A, with respect to the reflected light component from the reference surface Ref and the reflected light component from the surface Surf included in both the 0-order light and the 1-order light, the reflected light component from the reference surface Ref is denoted by a solid line and the reflected ling component from the surface Surf is indicated by a dotted line.

In addition, in FIG. 8A, the optical axis oax-0 of the 0-order light and the optical axis oax-1 of the 1-order light shown in FIG. 6 are also shown.

First, as shown in FIGS. 8A and 8B, the light-receiving portion 31 for the second laser includes a position control Photo Detector (PD) 31-R and a tilt-caused deviation amount detection PD 31-A.

The position control PD 31-R is a detector for detecting position control information of the laser beam based on the reflected light (that is, the light with a pit row or wobbling groove forming pattern) from the focal point R shown in FIG. 6.

In addition, the tilt-caused deviation amount detection PD 31-A is a detector for detecting the deviation amount from the optical axis C of the point A shown in FIG. 6, that is, the deviation amount of the spot positions of the first laser beam and the second laser beam due to the tilt.

As shown in FIG. 8B, as the position control PD 31-R and the tilt-caused deviation amount detection PD 31-A, four-divided detectors are employed. As shown, in four light-sensing elements E, F, H and G included in the position control PD 31-R, a set of "E and G" and a set of "F and H" are adjacent to each other in the tracking direction. Similarly, even in four light-sensing elements E1, F1, H1 and G1 included in the tilt-caused deviation amount detection PD 31-A, a set of "E1 and "G1" and a set of "F1 and H1" are adjacent to each other in the tracking direction.

A focal point by the focusing lens (see FIG. 6) of the reflected light from the reference surface Ref by the solid line with respect to the 0-order light denoted by the thick line in FIG. 8A is set to "r-0". The focal point by the focusing lens of the reflected light (dotted line) from the surface Surf of the 0-order light is set to "a-0". As shown in FIG. 8A, the focal point a-0 of the reflected light from the surface Surf is formed on the rear side of the focal point r-0 of the reflected light from the reference surface Ref. This is because, as shown in FIG. 6, the focal point A is formed at a position nearer the objective lens than the reference surface Ref.

The same operation is generated in the 1-order light side. That is, if a focal point by the focusing lens of the reflected light from the reference surface Ref by the solid line with respect to the 1-order light denoted by the thin line in FIG. 8A is set to "r-1", and the focal point by the focusing lens of the reflected light from the surface Surf denoted by the dotted line is set to "a-1", the focal point a-1 of the reflected light from the surface Surf is formed on the rear side of the focal point r-1 of the reflected light from the reference surface Ref.

Based on this point, in the present embodiment, the arrangement positions of the position control PD 31-R and the tilt-caused deviation amount detection PD 31-A in the light-sensing portion 31 for the second laser are set as follows.

That is, the position control PD 31-R is disposed at a position where the center position on the detection surface is matched to the focal point r-0 of the reflected light from the reference surface Ref included in the 0-order light side, in a state in which the focal point R of the second laser beam is matched to the reference surface Ref and the tilt and the lens shift are not generated.

In addition, similarly, the tilt-caused deviation amount detection PD 31-A is disposed at a position where the center position (the reference position of the deviation amount=0) on the detection surface is matched to the focal point a-1 of the reflected light from the surface Surf included in the 1-order light side, in a state in which the focal point R of the second laser beam is matched to the reference surface Ref and the tilt and the lens shift are not generated (that is, the state in which the focal point A of the reflected light from the surface Surf is matched on the optical axis C).

Figure 9A:
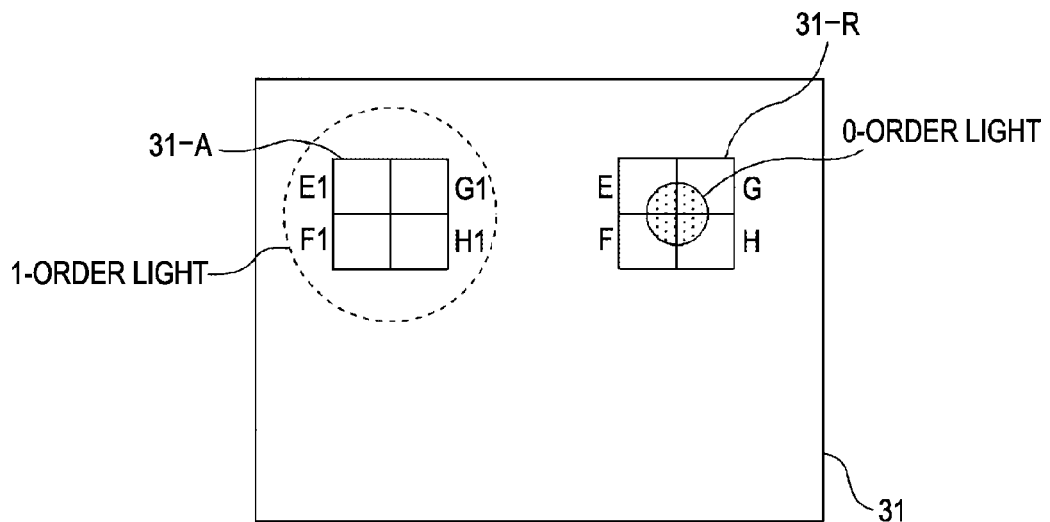
FIGS. 9A and 9B are diagrams illustrating a state of a light irradiated onto a light-sensing surface of a position control PD and a tilt-caused deviation amount detection PD.
Figure 9B:
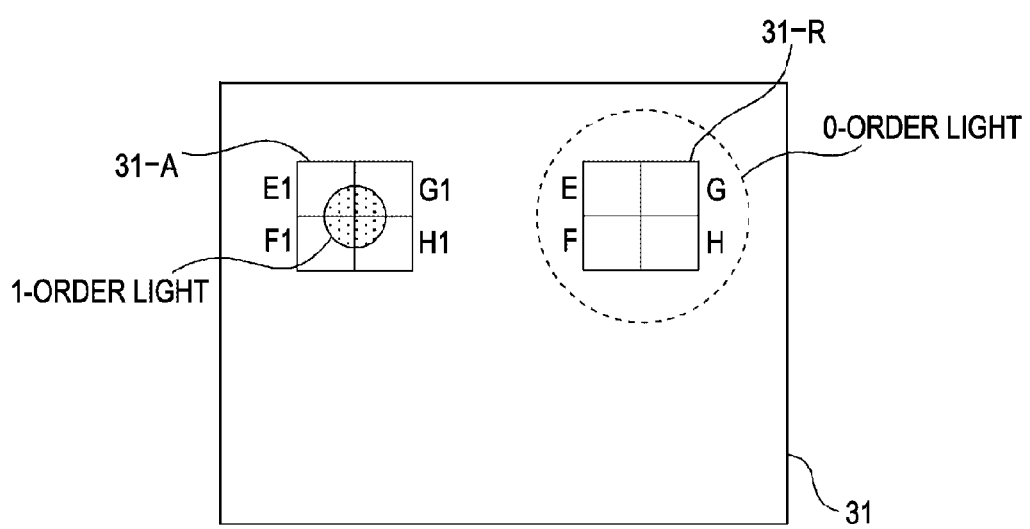

FIGS. 9A and 9B are diagrams illustrating the state of the light irradiated onto the detection surface of the position control PD 31-R and the tilt-caused deviation amount detection PD 31-A disposed by the above positional relationship.

First, FIG. 9A shows the state of the reflected light from the reference surface Ref. As shown, by the above-described arrangement of the position control PD 31-R and the tilt-caused deviation detection PD 31-A, the reflected light from the reference surface Ref is irradiated such that the 0-order light thereof forms a focusing spot on the position control PD 31-R. That is, by this operation, for example, information for position control of the laser beam such as a focus error signal or a tracking error signal may be detected based on the 0-order light of the reflected light from the reference surface Ref.

The 1-order light of the reflected light from the reference surface Ref is irradiated in a blurred state as shown in the drawing without forming a spot on the detection surface of the tilt-caused deviation amount detection PD 31-A, because the focal point r-1 is positioned on the rear side of the detection surface of the tilt-caused deviation amount detection PD 31-A (see FIG. 8A).

FIG. 9B shows the state of the reflected light from the surface Surf.

As shown, the reflected light from the surface Surf is irradiated in a state in which the 0-order light thereof is in a blurred state on the position control PD 31-R and the 1-order light thereof forms a focusing spot on the detection surface of the tilt-caused deviation amount detection PD 31-A, opposite to the reflected light from the reference surface Ref.

According to the arrangement of the PDs described with reference to FIGS. 8A and 8B, using the 0-order light and the 1-order light output by the detection light separation HOE 28, only the focusing spot of the 0-order light of the reflected light from the reference surface Ref may be formed on the position control PD 31-R and only the focusing spot of the 1-order light of the reflected light from the surface Surf may be formed on the tilt-caused deviation amount detection PD 31-A.

That is, by this operation, the detection of the information for position control of the laser beam based on the reflected light from the reference surface Ref and the tilt detection (the detection of the spot position deviation amount due to the tilt) based on the reflected light from the surface Surf may be independently performed.

According to the above description, the detection of the tilt amount is performed by sensing the 1-order light component by the detection light separation HOE 28 among the reflected light components from the surface Surf by the tilt-caused deviation amount detection PD 31-A and detecting the deviation amount of the light-sensing position. However, in detail, the deviation amount of the light-sensing position of the reflected light from the surface Surf is obtained by the following computation based on the light-sensing signals by the light-sensing elements E1, F1, G1 and H1 of the tilt-caused deviation amount detection PD 31-A.

That is, if the spot position deviation amount of the tracking direction, in other words, the tilt amount of the radial direction is D_skew_rad, $$D\_skew\_rad = E1 + G1 - (F1 + H1) \quad \text{Equation 2}$$

In addition, if the spot position deviation amount of the linear direction, that is, the tilt amount of the tangential direction is D_skew_tan, $$D\_skew\_tan = E1 + F1 - (G1 + H1) \quad \text{Equation 3}$$

Here, during actual recording, a problem particularly occurs when the spot position of the first laser beam is deviated from the spot position of the second laser beam in the tracking direction by the generation of the tilt in the radial direction.

From this viewpoint, in the present embodiment, the correction of the spot position deviation generated due to the tilt in the tangential direction is not performed, and the tilt detection of the radial direction and the correction of the spot position deviation in the tracking direction according to the detection result are performed.

Figure 10:
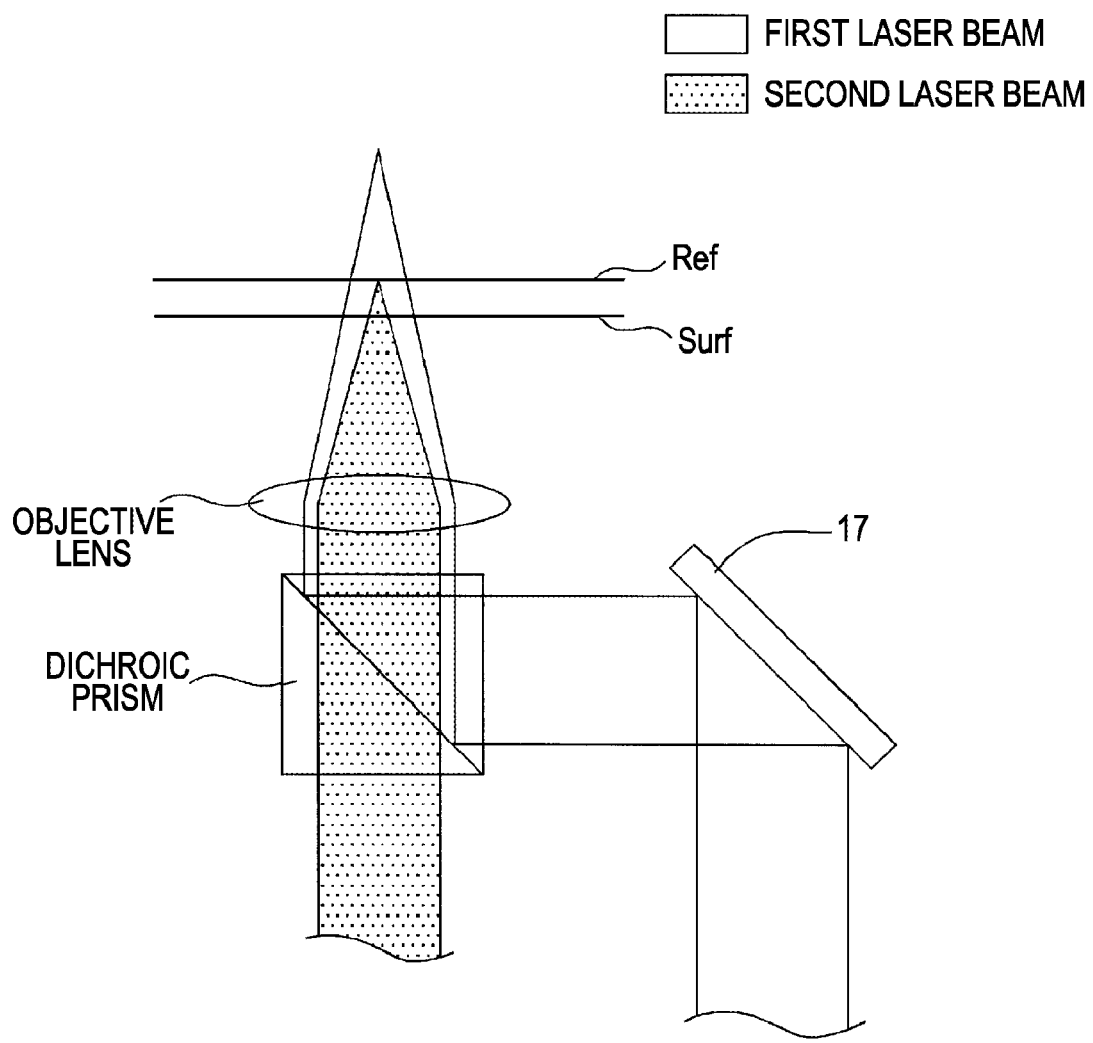
FIG. 10 is a diagram illustrating a configuration for correcting a spot position of a first laser beam.

In the present embodiment, the correction of the spot position of the first laser beam is performed, for example, using a galvanomirror 17 shown in FIG. 10. Here, as shown in FIG. 10, in this optical system, a dichroic prism is provided as a configuration for synthesizing the first laser beam and the second laser beam so as to be guided to the objective lens. That is, in this case, the dichroic prism having a selective reflection surface for reflecting the light of the same wavelength range as the first laser beam and transmitting the light with the other wavelength range is used, in consideration that the wavelength ranges of the first laser beam and the second laser beam are different.

By the dichroic prism, the first laser beam and the second laser beam are synthesized such that the optical axes thereof are mutually matched and are irradiated to the bulk type recording medium 1 through the objective lens.

As shown, the galvanomirror 17 is provided at the position where the first laser beam before being synthesized with the second laser beam enters by the dichroic prism. By changing the angle of the reflection surface of the galvanomirror 17, only the optical axis of the first laser beam may be independently adjusted so as to correct the spot position deviation of the first laser beam relative to the spot position of the second laser beam in the tracking direction.

In the present embodiment, by the changing the angle of the reflection surface of the galvanomirror 17 based on the value of the deviation amount D_skew_rad detected by Equation 2, the spot position of the first laser beam is corrected to be matched to the spot position of the second laser beam in the tracking direction.

At this time, it is noted that the detection of the deviation amount D_skew_rad is performed based on the second laser beam and the correction based on the deviation amount D_skew_rad is performed by adjusting the spot position of the first laser beam. That is, in this case, even when the correction is performed, the correction is not applied to the value of the deviation amount D_skew_rad. Accordingly, this correction control does not become feedback control for setting the value of the detected deviation amount D_skew_rad is set to "0".

In the present embodiment, the correction of the spot position of the first laser beam based on the detected deviation amount D_skew_rad is performed by calculating a correction amount (in this case, an angle adjustment amount of the galvanomirror 17) necessary for each deviation amount D_skew_rad by performing an experiment or the like in advance and using information indicating a relationship between the value of the deviation amount D_skew_rad and the correction amount.

For example, table information in which information about the correction amount is associated with the value of each deviation amount D_skew_rad is prepared, and the correction is performed by converting the value of the detected deviation amount D_skew_rad into the value of the correction amount using this table information.

Alternatively, the conversion of the value of the detected deviation amount D_skew_rad into the correction amount may be performed using a function indicating a relationship between the value of the deviation amount D_skew_rad and the necessary correction amount. In detail, the value of the detected deviation amount D_skew_rad is substituted into the function so as to calculate the value of the necessary correction amount value.

By controlling the driving of the galvanomirror 17 so as to adjust the angle of the reflection surface thereof based on the value of the correction amount obtained by such a conversion process, the spot position of the first laser beam is corrected to be matched to the spot position of the second laser beam in the tracking direction.

[3-3. Configuration of Optical Drive Device of First Embodiment]

Subsequently, the configuration of the optical drive device as a first embodiment for realizing the detection of the spot deviation amount due to the tilt and the correction of the spot position deviation will be described.

Here, the optical drive device of the first embodiment has a recording function and a reproduction function with respect to information (that is, information recorded as user data) recorded in the bulk layer 5 of the bulk type recording medium 1. In this sense, hereinafter, the optical drive device of the first embodiment is referred to as a recording/reproducing device 10.

FIG. 11 is a diagram showing the internal configuration of the recording/reproducing device 10 according to the first embodiment.

First, the bulk type recording medium 1 mounted in the recording/reproducing device 10 is rotated and driven by a spindle motor (not shown).

In the recording/reproducing device 10, an optical pickup OP for irradiating the first laser beam and the second laser beam to the rotated and driven bulk type recording medium 1 is provided.

In the optical pickup OP, a first laser 11 which is a light source of the first laser beam for performing information recording by a mark and reproduction of information recorded by a mark and a second laser 24 which is a light source of the second laser beam as a position control light (servo light) are provided.

Here, as described above, the first laser beam and the second laser beam have different wavelengths. In this example, the wavelength of the first laser beam is about 405 nm (so-called violet laser beam) and the wavelength of the second laser beam is about 650 nm (red laser beam).

In the optical pickup OP, the objective lens 20 which is an output terminal of the first laser beam and the second laser beam to the bulk type recording medium 1 is provided.

In addition, a light-sensing portion 23 for the first laser, which senses the reflected light from the bulk type recording medium 1 of the first laser beam and a light-sensing portion 31 for the second laser (see FIG. 6), which senses the reflected light from the bulk type recording medium 1 of the second laser beam are provided.

In addition, in the optical pickup OP, an optical system for guiding the first laser beam irradiated from the first laser 11 to the objective lens 20 and guiding the reflected light of the first laser beam from the bulk type recording medium 1 incident to the objective lens 20 to the light-sensing portion 23 for the first laser is formed. In detail, the first laser beam irradiated from the first laser 11 becomes a parallel light through a collimation lens 12 so as to enter into the polarization beam splitter 13. The polarization beam splitter 13 is configured to transmit the first laser beam incident from the first laser 11 side.

The first laser beam transmitting through the polarization beam splitter 13 enters into an expander including a lens 14, a lens 15, and a lens driving unit 16. This expander performs independent focus control with respect to the first laser beam by setting the lens 14 located close to the first laser 11, which is the light source, to a fixed lens, setting the lens 15 located far from the first laser 11 as a movable lens, and driving the lens 15 in a direction parallel to the optical axis of the first laser beam by the lens driving unit 16.

As described below, the expander (the lens driving unit 16) offsets the focusing position of the first laser beam based on the instruction of a controller 40 during recording and performs focus control of the first laser beam based on an output signal from a focus servo circuit 35 for the first laser during reproduction.

The first laser beam passing through the expander enters into the reflection surface of the galvanomirror 17. The galvanomirror 17 is provided at a position where the optical axis of the incident first laser beam may be bent substantially at 90°.

The galvanomirror 17 changes the angle of the reflection surface thereof based on a driving signal from the below-described optical axis correction driver 42 so as to adjust the angle of the optical axis of the first laser beam output through the reflection surface.

The first laser beam reflected from the galvanomirror 17 enters into a dichroic prism 19 through a ¼ wavelength plate 18. The dichroic prism 19 is configured such that the selective reflection surface thereof reflects a light with the same wavelength range as the first laser beam and transmits a light with the other wavelength range. Accordingly, the incident first laser beam is reflected from the dichroic prism 19.

The first laser beam reflected from the dichroic prism 19 is irradiated onto the bulk type recording medium 1 through the objective lens 20, as shown.

In the objective lens 20, a biaxial mechanism 21 for displaceably holding the objective lens 20 in the focus direction (the direction abutting on or separated from the bulk type recording medium 1) and the tracking direction (the direction perpendicular to the focus direction: the radius direction of the bulk type recording medium 1) is provided.

The biaxial mechanism 21 displaces the objective lens 20 in the focus direction and the tracking direction by respectively applying driving current from a below-described focus servo circuit 37 for the second laser and a tracking servo circuit 38 to a focus coil and a tracking coil.

During reproduction, by irradiating the first laser beam to the bulk type recording medium 1 as described above, the reflected light of the first laser beam is obtained from the bulk type recording medium 1 (the mark string recorded in the information recording layer L to be reproduced in the bulk layer 5). The reflected light of the first laser beam obtained by the above operation is guided to the dichroic prism 19 through the objective lens 20 and is reflected from the dichroic prism 19.

The reflected light of the first laser beam reflected from the dichroic prism 19 passes through the ¼ wavelength plate 18, the galvanomirror 17 and the expander (the lens 15 and the lens 14) and then enters into the polarization beam splitter 13.

The polarization direction of the reflected light (returning light) of the first laser beam incident to the polarization beam splitter 13 is different from that of the first laser beam (forward light) incident from the first laser 11 side to the polarization beam splitter 13 by 90°, by the operation by the ¼ wavelength plate 18 and the reflection operation of the bulk type recording medium 1. As a result, the reflected light of the incident first laser beam is reflected from the polarization beam splitter 13.

The reflected light of the first laser beam reflected from the polarization beam splitter 13 is focused on the detection surface of the light-sensing portion 23 for the first laser through the focusing lens 22.

In the optical pickup OP, in addition to the above-described configuration of the optical system for the first laser beam, an optical system for guiding the second laser beam irradiated from the second laser 24 to the objective lens 20 and guiding the reflected light of the second laser beam incident to the objective lens 20 and reflected from the bulk type recording medium 1 to the light-sensing portion 31 for the second laser is formed.

As shown, the second laser beam irradiated from the second laser 24 becomes a parallel light through a collimation lens 25 and enters into a polarization beam splitter 26. The polarization beam splitter 26 is configured so as to transmit the second laser beam (forward light) incident from the second laser 24 side.

The second laser beam transmitting through the polarization beam splitter 26 enters into the dichroic prism 19 through a ¼ wavelength plate 27.

As described above, the dichroic prism 19 is configured so as to reflect a light with the same wavelength range as the first laser beam and transmit a light with the other wavelength range. Accordingly, the second laser beam transmits through the dichroic prism 19 so as to be irradiated to the bulk type recording medium 1 through the objective lens 20.

The reflected light (in particular, in this case, the reflected light from the reference surface Ref and the reflected light from the surface Surf) of the second laser beam obtained by irradiating the second laser beam to the bulk type recording medium 1 passes through the objective lens 20, transmits the dichroic prism 19 and enters into the polarization beam splitter 26 through the ¼ wavelength plate 27.

Similarly to the first laser beam, the polarization direction of the reflected light (returning light) of the second laser beam incident from the bulk type recording medium 1 side is different from that of the forward light by 90°, by the operation of the ¼ wavelength plate 27 and the reflection operation of the bulk type recording medium 1, and thus the reflected light of the second laser beam as the returning light is reflected from the polarization beam splitter 26.

Thus, the reflected light of the second laser beam reflected from the polarization beam splitter 26 passes through the detection light separation HOE 28, the focusing lens 29 and the cylindrical lens 30 so as to be focused on the detection surface of the light-sensing portion 31 for the second laser.

Here, although not shown in FIG. 11, the detection light separation HOE 28 outputs a diffracted light (1-order light) at a position deviated in the tracking direction as shown in FIG. 6.

In addition, as described with reference to FIGS. 8A and 8B, the light-sensing portion 31 for the second laser is set such that the arrangement position of the position control PD 31-R and the tilt-caused deviation amount detection PD 31-A included therein satisfy the following condition.

That is, in the position control PD 31-R, the center position of the detection surface thereof is matched to the focal point r-0 by the focusing lens 29 of the reflected light from the reference surface Ref included in the 0-order light of the reflected light of the second laser beam transmitting through the detection light separation HOE 28 in a state in which the focal point R of the second laser beam is matched to the reference surface Ref and the tilt and the lens shift are not generated.

That is, in the tilt-caused deviation amount detection PD 31-A, similarly, the center position (reference position of deviation amount=0) of the detection surface thereof is matched to the focal point a-1 by the focusing lens 29 of the reflected light from the surface Surf included in the 1-order light of the reflected light of the second laser beam output from the detection light separation HOE 28, in a state in which the focal point R of the second laser beam is matched to the reference surface Ref and the tilt and the lens shift are not generated.

Although the description is omitted, practically, in the recording/reproducing device 10, a slide driving unit for sliding and driving the overall above-described optical pickup OP in the tracking direction is provided so as to widely displace the irradiation position of the laser beam by the driving of the optical pickup OP by the slide driving unit.

In the recording/reproducing device 10, together with the above-described optical pickup OP, a recording processing unit 32, a light-sensing signal processing unit 33 for the first laser, a reproduction processing unit 34, a focus servo circuit 35 for the first laser, a light-sensing signal processing unit 36 for the second laser, a focus servo circuit 37 for the second laser, a tracking servo circuit 38, a position information detection unit 39, a controller 40, a correction amount conversion unit 41 and an optical axis correction driver 42 are provided.

First, data to be recorded (recording data) to the bulk type recording medium 1 is input to the recording processing unit 32. The recording processing unit 32 performs addition of an error correction code or predetermined recording modulation encoding with respect to the input recording data and obtains a recording modulation data string which is a binary data string of "0" and "1" actually recorded in the bulk type recording medium 1.

The recording processing unit 32 performs emission drive of the first laser 11 based on the generated recording modulation data string according to an instruction from the controller 40.

The light-sensing signal processing unit 33 for the first laser includes a current/voltage conversion circuit, a matrix calculation/amplification circuit and the like in correspondence with the output current from a plurality of light-sensing elements as the light-sensing portion 23 for the first laser and generates a necessary signal by the matrix calculation process.

In detail, a high frequency signal (hereinafter, referred to as a reproduction signal RF) corresponding to a reproduction signal reproducing the recording modulation data string, a focus error signal FE-1 for focus servo control, and a tracking error signal FE-1 for tracking servo control are generated.

The reproduction signal RF generated by the light-sensing signal processing unit 33 for the first laser is supplied to the reproduction processing unit 34. The focus error signal FE-1 is supplied to the focus servo circuit 35 for the first laser and the tracking error signal TE-1 is supplied to the tracking servo circuit 38.

The reproduction processing unit 34 performs a reproduction process for restoring the above-described recording data, such as a binarization process, a process of decoding the recording modulation code, or an error correction process, with respect to the reproduction signal RF and obtains the reproduction data reproducing the recording data.

The focus servo circuit 35 for the first laser generates a focus servo signal based on the focus error signal FE-1 and controls the driving of the lens driving unit 16 based on the focus servo signal so as to perform the focus servo control of the first laser beam.

As can be understood from the above description, the focus servo control of the first laser beam by the driving of the lens driving unit 16 based on the reflected light of the first laser beam is performed during reproduction.

The focus servo circuit 35 for the first laser controls the driving of the lens driving unit 16 so as to perform an interlayer jump operation between the information recording layers L (mark string) formed in the bulk type recording medium 1 or the pull-in of the focus servo for the necessary information recording surface L, according to an instruction from the controller 40, in correspondence with reproduction.

In regard to the second laser beam side, the light-sensing signal processing unit 36 for the second laser generates a necessary signal based on the light-sensing signal from the plurality of light-sensing elements (E, F, G and H, and E1, F1, G1 and H1) in the above-described light-sensing portion 31 for the second laser.

In detail, the light-sensing signal processing unit 36 for the second laser generates the focus error signal FE-2 and the tracking error signal TE-2 for the respective focus and tracking servo control.

In addition, a position information detection signal fpd for performing the detection of the absolute position information recorded in the reference surface Ref is generated.

In particular, in the present embodiment, a tilt-caused error signal indicating the deviation amount D_skew_rad due to the tilt is generated and is hereinafter referred to as a "tilt-caused error signal D_skew_rad".

Figure 12:
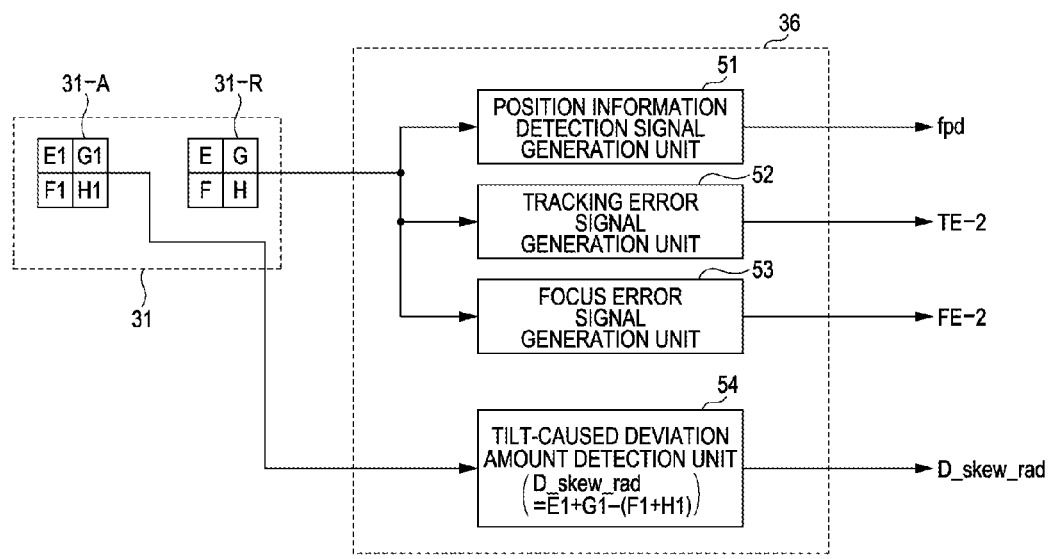
FIG. 12 is a diagram showing the internal configuration of a light-sensing signal processing unit for a second laser included in the optical drive device according to a first embodiment.

FIG. 12 is a diagram showing the internal configuration of a light-sensing signal processing unit 36 for the second laser.

In FIG. 12, the internal configuration of the light-sensing portion 31 for the second laser is also shown.

As shown in FIG. 12, in the light-sensing signal processing unit 36 for the second laser, a position information detection signal generation unit 51, a tracking error signal generation unit 52, a focus error signal generation unit 53 and a tilt-caused deviation amount detection unit 54 are provided.

The position information detection signal generation unit 51 receives light-sensing signals from the light-sensing elements E, F, G and H of the position control PD 31-R in the light-sensing portion 31 for the second laser and generates a position information detection signal fpd for performing the detection of the absolute position information recorded in the reference surface Ref. For example, if the absolute position information is generated by the pit rows, the position information detection signal fpd is generated by a sum signal of the light-sensing signals from the light-sensing elements E, F, G and H. Alternatively, if the absolute position information is recorded by wobbling grooves, the position information detection signal fpd is generated by a push-pull signal.

The tracking error signal generation unit 52 generates the tracking error signal TE-2 based on the light-sensing signals from the light-sensing elements E, F, G and H of the position control PD 31-R and the focus error signal generation unit 53 generates the focus error signal FE-2 based on the light-sensing signal from the light-sensing elements E, F, G and H of the position control PD 31-R.

The tilt-caused deviation amount detection unit 54 receives the light-sensing signals from the light-sensing elements E1, F1, G1 and H1 in the tilt-caused deviation amount detection PD 31-A and performs calculation of Equation 2 based on the light-sensing signals so as to generate the tilt-caused error signal (tilt-caused deviation amount) D_skew_rad.

The description returns to FIG. 11.

The position information detection signal fpd generated by the light-sensing signal processing unit 36 for the second laser is supplied to the position information detection unit 39, as shown. The position information detection unit 39 detects the absolute position information recorded in the reference surface Ref based on the position information detection signal fpd. The detected absolute position information is supplied to the controller 40.

The focus error signal FE-2 generated by the light-sensing signal processing unit 36 for the second laser is supplied to the focus servo circuit 37 for the second laser.

The tracking error signal TE-2 is supplied to the tracking servo circuit 38.

The tilt-caused error signal D_skew_rad is supplied to the correction amount conversion unit 41.

The focus servo circuit 37 for the second laser generates the focus servo signal based on the focus error signal FE-2 and drives the focus coil of the biaxial mechanism 21 based on the focus servo signal so as to perform the focus servo control of the objective lens 20. As described above, the focus servo control of the objective lens 20 is performed based on the reflected light of the second laser beam both during recording and during reproduction.

The focus servo circuit 37 for the second laser drives the focus coil so as to perform the pull-in of the focus servo to the selective reflection film 3 (reference surface Ref) formed in the bulk type recording medium 1 according to an instruction from the controller 40.

The tracking servo circuit 38 performs the driving of the tracking coil of the biaxial mechanism 21 based on any one of the tracking error signal TE-1 from the light-sensing signal processing unit 33 for the first laser or the tracking error signal TE-2 from the light-sensing signal processing unit 36 for the second laser, based on an instruction from the controller 40.

As described above, the tracking servo control of the objective lens 20 is performed based on the reflected light of the second laser beam, during recording, and, during reproduction, is performed based on the reflected light of the second laser beam before the access is completed and is performed based on the reflected light of the first laser beam after the access is completed.

The tracking servo circuit 38 generates the tracking servo signal based on the tracking error signal TE-2 and drives the tracking coil of the biaxial mechanism 21 based on the tracking servo signal, according to an instruction from the controller 40, during recording. During reproduction, before the access is completed, the tracking servo signal is generated based on the tracking error signal TE-2 and the tracking coil of the biaxial mechanism 21 is driven based on the tracking servo signal, according to an instruction from the controller 40 and, after the access is completed, the tracking servo signal is generated based on the tracking error signal TE-1 and the tracking coil of the biaxial mechanism 21 is driven based on the tracking servo signal, according to an instruction from the controller 40.

In addition, the tracking servo circuit 38 performs the pull-in operation of the tracking servo or the track jump operation according to an instruction from the controller 40.

The controller 40 includes a micro computer including, for example, a Central Processing Unit (CPU) or a memory (storage device) such as a Read Only Memory (ROM), and executes a control process according to a program stored in the ROM or the like so as to perform the overall control of the recording/reproducing device 10.

In detail, the controller 40 performs the control (the selection of the recording position in the depth direction) of the focusing position of the first laser beam based on the value of the offset "of" set in correspondence with each layer position in advance as described with reference to FIG. 2, during recording. In detail, the controller 40 drives the lens driving unit 16 based on the value of the offset "of" set in correspondence with the layer position to be recorded so as to perform the selection of the recording position in the depth direction.

As described above, the tracking servo control during recording is performed based on the reflected light of the second laser beam. Accordingly, the controller 40 instructs the tracking servo circuit 38 to execute the tracking servo control based on the tracking error signal TE-2, during recording.

Meanwhile, during reproduction, the controller 40 instructs the focus servo control circuit 35 for the first laser to focus the first laser beam on the information recording layer L (forming position of the mark string) in which data to be reproduced is recorded. That is, in regard to the first laser beam, the focus servo control is executed with respect to the information recording layer L.

During reproduction, the controller 40 instructs the tracking servo circuit 38 to change the tracking servo control before/after the access is completed. In detail, before the access is completed, the tracking servo control is executed based on the tracking error signal TE-2 and, after the access is completed, the tracking servo control is executed based on the tracking error signal TE-1.

In the recording/reproducing device 10, the correction amount conversion unit 41 and the optical axis correction driver 42 are provided as a configuration for performing the correction of the spot deviation due to the tilt.

The correction amount conversion unit 41 converts the value of the tilt-caused error signal D_skew_rad (the value of the deviation amount D_skew_rad) generated by the light-sensing signal processing unit 36 for the second laser into the value of the correction amount of the galvanomirror 17. In detail, the correction amount conversion unit 41 converts the value of the deviation amount D_skew_rad into the value of the correction amount of the galvanomirror 17 based on the above-described table information indicating the relationship between the deviation amount D_skew_rad and the correction amount or the information about the function.

The optical axis correction driver 42 controls the driving of the galvanomirror 17 based on the value of the correction amount obtained by the correction amount conversion unit 41. Accordingly, the correction of the spot position of the first laser beam is performed such that the spot position of the first laser beam is matched to the position in the tracking direction of the spot position of the second laser beam.

As can be understood from the description of FIGS. 2 and 3, the spot position deviation between the first laser beam and the second laser beam is problematic mainly during recording (because the servo control of the first laser beam is performed with respect to the recorded mark string, during reproduction). That is, in the present embodiment, the correction operation of the spot position deviation by controlling the driving of the galvanomirror 17 is performed only during recording.

In correspondence therewith, the controller 40 instructs the optical axis correction driver 42 to control the driving of the galvanomirror 17 based on the value of the correction amount only during recording.

Alternatively, the correction operation of the spot position deviation may be performed even during reproduction.

According to the above description, even during reproduction, before the access is completed, the position control of the tracking direction of the objective lens 20 is performed based on the reflected light of the second laser beam. At the timing when the access to the reproduction start position is completed, the pull-in operation of the tracking servo of the first laser beam is performed with respect to the mark string to be reproduced. However, at this time, if the position of the first laser beam is deviated from the second laser beam, the pull-in may not be smoothly performed.

In consideration of this point, even during reproduction, before the access to the reproduction start position is completed (that is, during the access operation), the spot position deviation correction of the first laser beam by the galvanomirror 17 may be executed. In this case, the controller 40 instructs the optical axis correction driver 42 to execute the driving control based on the value of the correction amount of the galvanomirror 17 during recording and during the access operation of the reproduction.

As described above, according to the first embodiment, using the reflected light from the surface of the bulk type recording medium 1 of the second laser beam as the position control light, it is possible to perform the detection of the tilt amount and, more particularly, the detection of the deviation amount between the spot position of the recording/reproducing light (first laser beam) and the spot position of the position control light (second laser beam) generated due to the tilt.

Accordingly, in the detection of the tilt amount (the spot position deviation amount due to the tilt), it is unnecessary to provide a separate light source as in the tilt sensor 165 of the related art, and the optical system for tilt detection may be assembled in the optical system for mark recording/reproduction or position control.

That is, according to the first embodiment, as in the case of using the tilt sensor of the related art, it is unnecessary to secure a space for the optical system for tilt detection outside the optical system for recording/reproduction of the mark or position control. As a result, it is possible to reduce device manufacturing cost or realize device miniaturization, by reducing the number of parts as compared with the related art.

In the first embodiment, when the reflected light from the reference surface Ref and the reflected light from the surface Surf are independently detected, the detection light separation HOE 28 is used. By using the detection light separation HOE, it is possible to independently detect the reflected light from the reference surface Ref and the reflected light from the surface Surf, which are originally focused on the same optical axis.

For example, if the reflected light from the reference surface Ref and the reflected light from the surface Surf are independently detected, a method of spectrally splitting the reflected light from the bulk type recording medium 1 by a semi-transparent mirror or the like and detecting the reflected lights through different optical paths may be employed. In this case, the position control PD and the tilt-caused deviation amount detection PD 31-A may be disposed at relatively separated positions.

In contrast, if the detection light separation HOE 28 is used, as can be seen from FIG. 6, the position control PD and the tilt-caused deviation amount detection PD 31-A may be disposed at very close positions and may be integrally provided in the common light-sensing portion. That is, it is possible to reduce the number of parts.

4. Second Embodiment

Detection Correction of Spot Deviation Including Spot Deviation Due to Lens Shift

[4-1. Method of Detecting Spot Deviation Amount due to Lens Shift]

Subsequently, a second embodiment will be described. In the second embodiment, the detection and correction of the spot position deviation due to lens shift as well as tilt are performed.

Even in the second embodiment, only the tracking direction is considered with respect to the detection and correction of the spot position deviation amount.

As described in Japanese Unexamined Patent Application Publication No. 2008-310848, in the case where information recording or reproduction of recorded information by mark formation is performed by focusing a first light at a necessary position in a recording layer of an optical recording medium by an objective lens, a second light is focused on a reflection film, in which a position guide element of the optical recording medium is formed, through the objective lens, and the position of the objective lens is controlled such that the spot position of the second light follows the position guide element based on the reflected light of the second light focused on the reflection film, when the lens shift (tracking movement) of the objective lens occurs, the spot position of the first light is not positioned just below the spot position of the second light and a spot position deviation is generated.

That is, as described in Japanese Unexamined Patent Application Publication No. 2008-310848 (in particular, FIGS. 5 and 6), if the center of the objective lens is deviated from the center reference position C-ol (see FIG. 5) in the tracking direction, the optical axis of the recording/reproduction light and the optical axis of the position control light are refracted by the objective lens, but, at this time, since the focus positions (the spot positions in the focus direction) of the recording/reproduction light and the position control light are different (the recording/reproduction light=the inside of the bulk layer 5 and the position control light=reference surface Ref), a spot position deviation between the recording light and the position control light is generated even in a direction perpendicular to the focus direction.

As can be understood from the above description, the spot position deviation between the first laser beam and the spot position of the second laser beam is generated due to lens shift as well as tilt.

Accordingly, in the second embodiment, a method of correcting the spot position deviation due to such lens shift is proposed.

First, when the correction of the spot position deviation due to lens shift is performed. The detection of the spot position deviation amount due to lens shift is performed.

In the second embodiment, the detection of the spot position deviation amount due to lens shift is performed by the following method.

Figure 13:
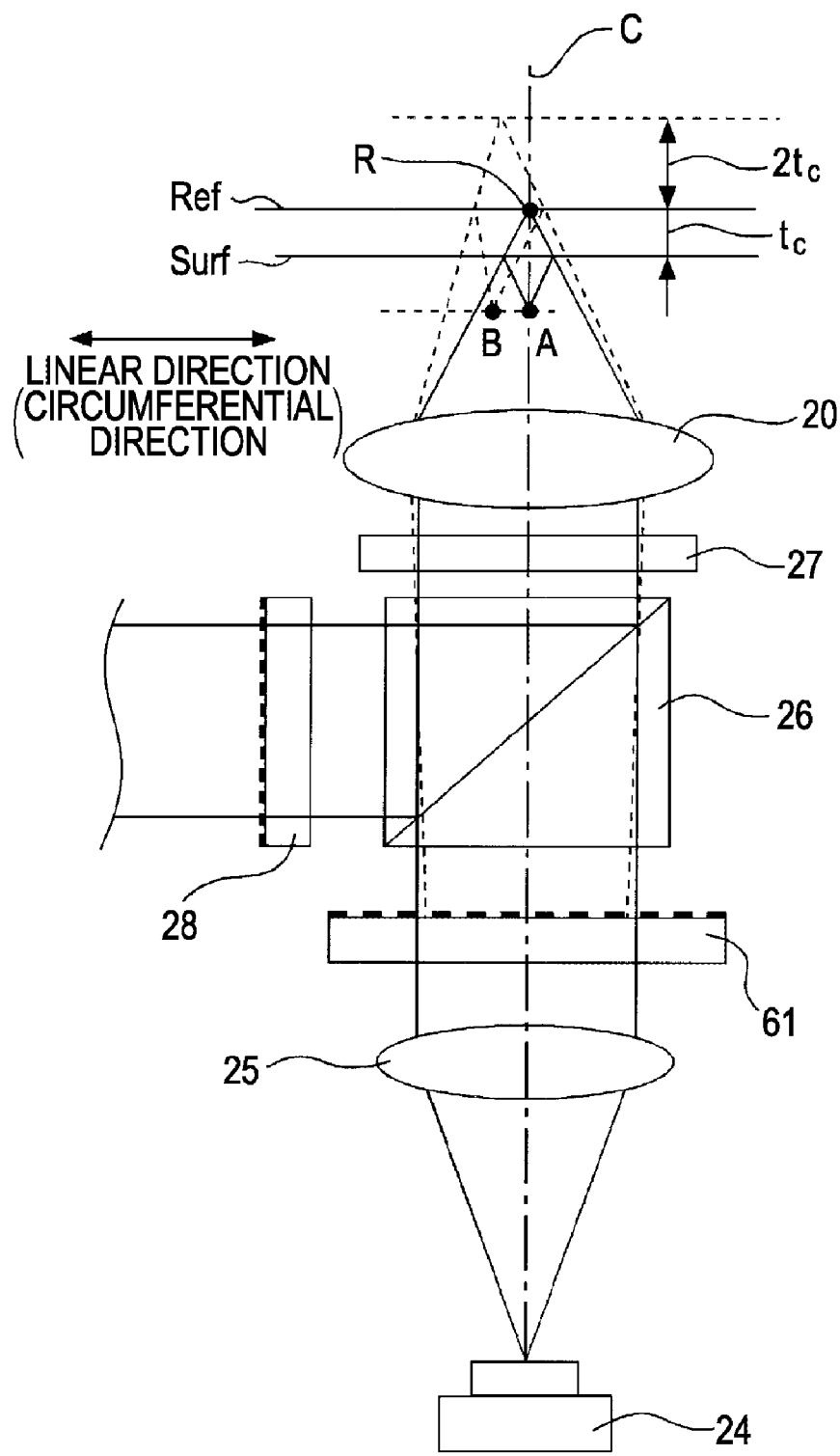
FIG. 13 is a diagram showing a configuration example of an optical system for generating a detection light for detecting a spot position deviation amount due to lens shift.

FIG. 13 is a diagram showing a configuration example of an optical system for generating a detection light for detecting a spot position deviation amount due to lens shift.

In FIG. 13, the same portions among the portions configuring the optical system of the second laser beam shown in FIG. 11 are denoted by the same reference numerals, but the dichroic prism 19, the focusing lens 29 and the cylindrical lens 30 shown in FIG. 11 are not shown.

In addition, in FIG. 13, it is noted that the horizontal direction of paper is the linear direction of the bulk type recording medium 1.

As can be seen from FIG. 13, in the second embodiment, in the optical system of the second laser included in the recording/reproducing device 10 of the first embodiment, an irradiation light separation HOE 61 is newly inserted.

The irradiation light separation HOE 61 is inserted at a position of the light source side rather than a spectroscopic point (here, corresponding to the selective reflection surface of a polarization beam splitter 26) for spectrally splitting the reflected light from the bulk type recording medium 1 of the second laser beam from an optical path for guiding the second laser beam emitted from at least a light source (second laser 24) to an objective lens 20, in detail, in this case, is inserted between a collimation lens 25 and the polarization beam splitter 26 as shown in the drawing.

The irradiation light separation HOE 61 transmits the second laser beam incident from the second laser 24 through the collimation lens 25 as the 0-order light and generates and outputs a diffracted light (1-order light: dotted line of the drawing) at a position deviated in the linear direction as shown. At this time, as the diffracted light output from the irradiation light separation HOE 61, the focal point by the objective lens 20 of the diffracted light is at the rear side (lower layer side) from the reference surface Ref by a distance $2t_c$ as shown in the drawing in a state in which the focal point R of the second laser beam is matched to the reference surface Ref. In other words, the position of the focal point of the diffracted light is the rear side from the reference surface Ref by a distance twice the distance between the surface Surf and the reference surface Ref.

The adjustment of the position of the focal point of the diffracted light may be performed by, for example, setting of the distance between the irradiation light separation HOE 61 and the objective lens 20 (at this time, the position of the objective lens 20 is the position where the focal point R of the second laser beam is matched to the reference surface Ref) or the hologram pattern of the irradiation light separation HOE 61.

Figure 14:
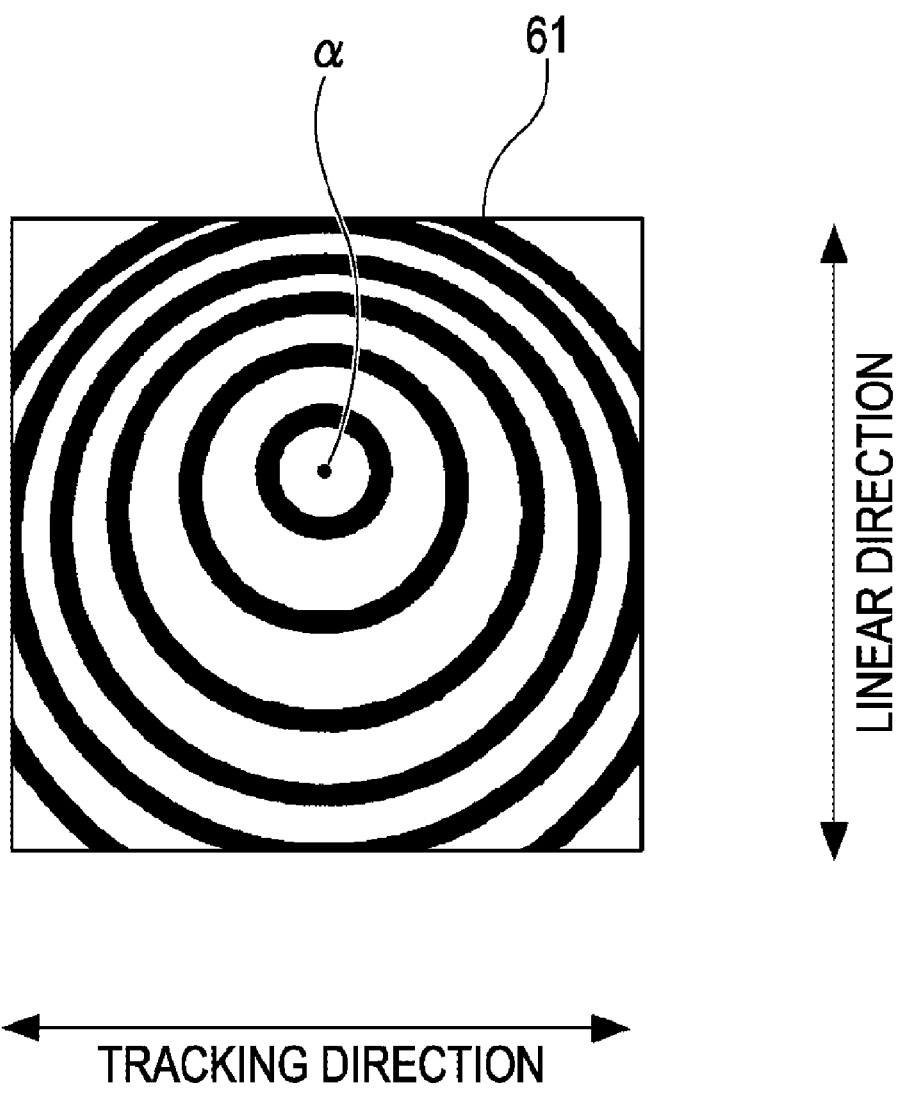
FIG. 14 is a diagram showing a hologram pattern set to an irradiation light separation HOE.

FIG. 14 is a diagram showing an example of a hologram pattern of the irradiation light separation HOE 61 for generating and outputting the diffracted light at a position deviated in the linear direction.

As shown in FIG. 14, even in the irradiation light separation HOE 61, an eccentric hologram pattern is formed similarly to the detection light separation HOE 28 shown in FIG. 7. In this case, the center α of each circle is set to a position slanted to any one of not the tracking direction but the linear direction. By this configuration, it is possible to output the diffracted light in the direction in which the center in the direction (in this case, the upper direction of the paper) to which the center α is slanted in the linear direction.

The description returns to FIG. 13.

When the diffracted light (1-order light) focused at the position which is the rear side (lower layer side) from the reference surface Ref by the distance $2t_c$ is irradiated to the bulk type recording medium 1, the reflected light from the reference surface Ref of the diffracted light is focused on a B point of the drawing (hereinafter, referred to as a focal point B).

At this time, the position of the focus direction of the focal point B is matched to the focal point A of the reflected light from the surface Surf of the 0-order light (light beam denoted by a solid line of the drawing) of the second laser beam.

In the second embodiment, the detection of the deviation amount due to the lens shift is performed based on the result of detecting the deviation amount of the focal point B of the reflected light from the reference surface Ref of the 1-order light by the irradiation light separation HOE 61 of the second laser beam formed by the above method.

Figure 15A:
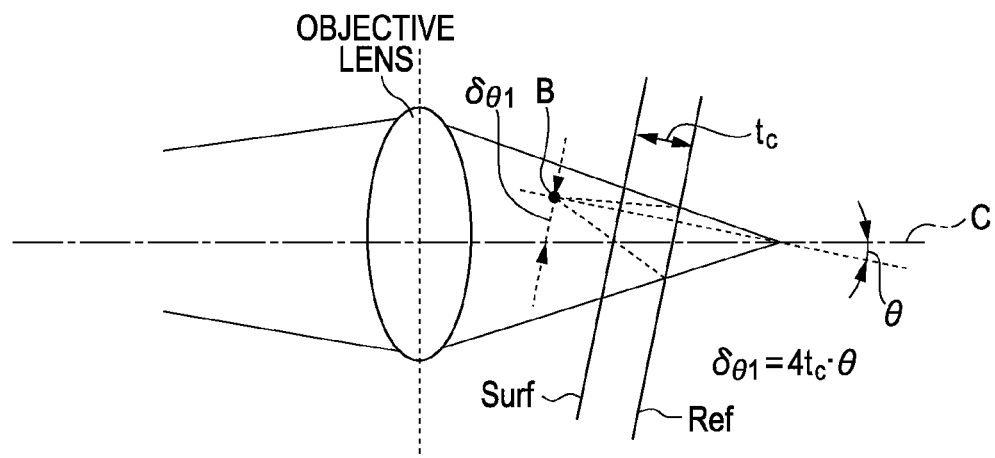
FIGS. 15A and 15B are diagrams showing a behavior of a focal point B for a tilt and a behavior of a focal point B for lens shift.

FIG. 15A is a diagram showing the behavior of the focal point B for a tilt and FIG. 5B is a diagram showing a behavior of a focal point B for lens shift.

In FIG. 15A, the tilt is generated in a radial direction.

As shown in FIG. 15A, similarly to the focal point A, even the focal point B is deviated from the optical axis C due to the generation of the tilt.

In detail, the deviation amount $\delta_{\theta 1}$ from the optical axis C of the focal point B due to the lens shift becomes Equation 4 when tilt 8° is generated from the state in which the tilt is not generated.

$$\delta_{\theta 1}=4t_c\cdot\theta \qquad \text{Equation 4}$$

Figure 15B:
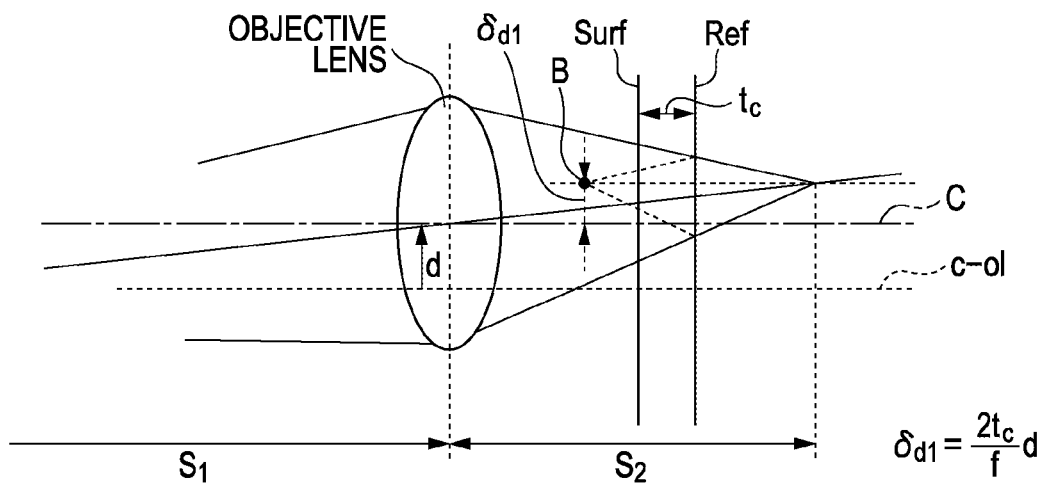

As shown in FIG. 15B, the focal point B is deviated from the optical axis C by the lens shift of the objective lens.

In addition, if the deviation amount $\delta_{d1}$ from the optical axis C of the focal point B when the objective lens is moved by a distance d in the tracking direction in a state in which the center thereof is matched to the central reference axis c-ol becomes Equation 5 by the distance $S_1=f(f+2t_c)/2t_c$ between the objective lens and the object point of the objective lens and the distance $S_2=f+2t_c$ between the objective lens and the focal point of the 1-order light of the irradiation light separation HOE 61 when the focal distance of the objective lens is f.

$$\delta_{d1}=2t_c/f\cdot d \qquad \text{Equation 5}$$

The focal point B is deviated from the optical axis C due to both the tilt and the lens shift. In other words, when the deviation amount of the focal point B is detected, the value of the deviation amount from the optical axis C includes both the deviation amount due to the tilt and the deviation amount due to the lens shift.

If the deviation amount of the focal point B is detected by the above method, it is possible to obtain a value including the spot position deviation amount between the first laser beam and the second laser beam due to both the tilt and the lens shift.

Accordingly, the correction of this case is performed using only the result of detecting the deviation amount of the focal point B.

However, a problem occurs that the correction control of the spot position of the first laser beam is not performed by feedback control as described above.

That is, in the case where the correction of the spot position of the first laser beam from the spot position deviation amount detected based on the reflected light of the second laser beam is performed, as described in the first embodiment, it is necessary to calculate a relationship between the value of the detected deviation amount and the correction amount for the spot position of the first laser beam necessary at that time in advance by an experiment or the like.

On the assumption that the necessary correction amount is calculated in advance, from the viewpoint of simplification of the separation operation, it is preferable that the calculation of the necessary correction amount corresponding to the deviation amount due only to the tilt and the calculation of the necessary correction amount corresponding to the deviation amount due only to the lens shift are independently performed.

In other words, since an operation for calculating the necessary correction amount with respect to the value of the deviation amount of the focal point B including both the deviation amount due to the tilt and the deviation amount due to the lens shift is very complicated, this operation is preferably avoided.

From this viewpoint, in the second embodiment, the deviation amount due to the tilt and the deviation amount due to the lens shift are individually detected and information about the correction amount due to the tilt and information about the correction amount due to the lens shift are individually obtained. Then, the correction of the spot position of the first laser beam based on the information about the correction amounts is performed.

At this time, how the deviation amount due only to the lens shift is detected is considered. However, referring to Equation 2 (FIG. 4B), it can be seen that the value of the deviation amount $\delta_{\theta 0}(=2t_c\cdot\theta)$ due to the tilt of the focal point A described in the first embodiment is ½ of the value of the deviation amount $\delta_{\theta 1}(=4t_c\cdot\theta)$ due to the tilt of the focal point B shown in Equation 4.

If this relationship is used, it is possible to extract the value of the deviation amount due only to the lens shift from the value (the value including the deviation amount due to both the tilt and the lens shift) of the deviation amount of the focal point B, using the value of the deviation amount (D_skew) due to the tilt described in the first embodiment.

In detail, if the deviation amount (only the tracking direction is considered) of the focal point B is "D_b_rad", the deviation amount due to the lens shift=D_shift_rad is may be obtained by Equation 6.

$$D\_shift\_rad = D\_b\_rad - 2 \cdot D\_skew\_rad \quad \text{Equation 6}$$

[4-2. Detailed Configuration for Detecting Deviation Amount]

If the deviation amount (D_b_rad) of the focal point B is detected by the method, the value of the deviation amount D_shift_rad due only to the lens shift may be obtained by subtracting the value which is twice the deviation amount (deviation amount due to the tilt: D_skew_rad) of the focal point A described in the first embodiment from that value.

The detailed configuration for detecting the deviation amount of the focal point B will be described with reference to FIGS. 16 and 17.

Figure 16A:
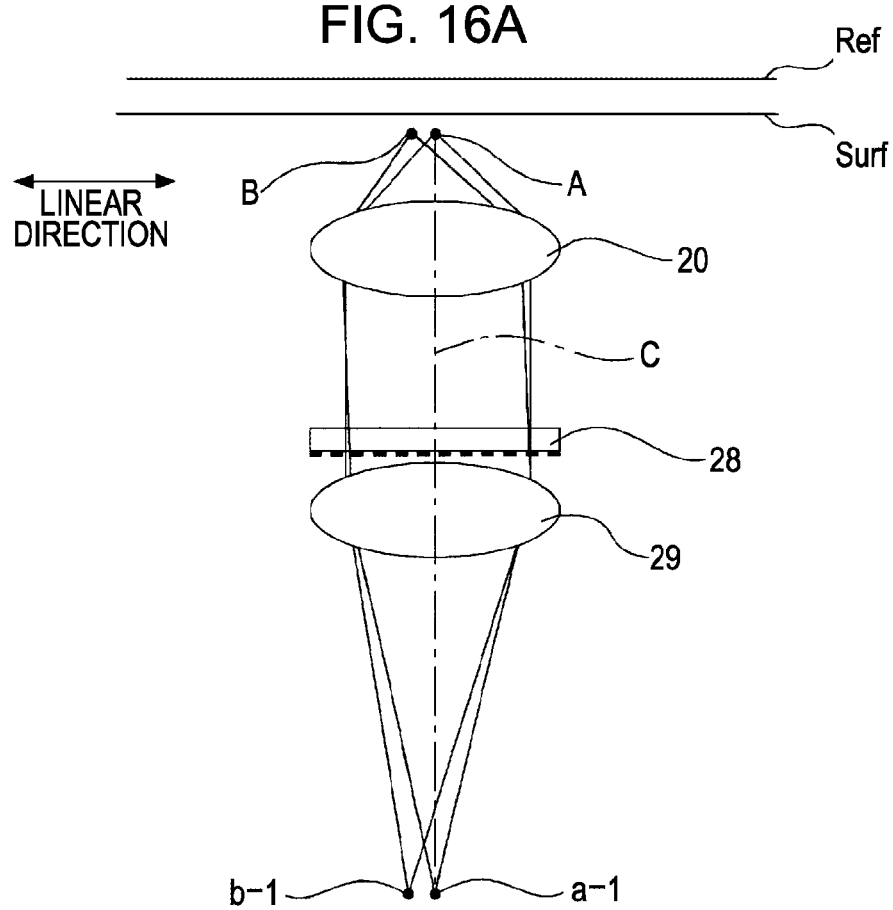
FIGS. 16A and 16B are diagrams illustrating the detailed configuration for detecting a deviation amount of a focal point B.
Figure 16B:
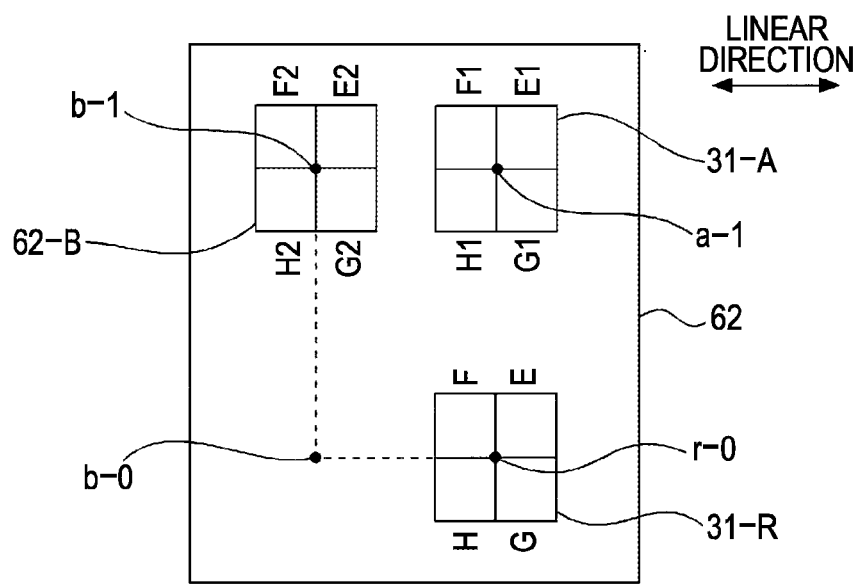

FIGS. 16A and 16B are diagrams illustrating the detailed configuration for detecting the deviation amount of the focal point B. FIG. 16A shows only the configuration of the main portions in the deviation amount detection based on the reflected light of the second laser beam with the surface Surf and the reference surface Ref of the bulk type recording medium 1 and FIG. 16B is a plan view of the detection surface of the light-sensing portion 62 for the second laser included in the second embodiment.

As shown, in FIGS. 16A and 16B, the horizontal direction of paper is a linear direction.

In the second embodiment, it is assumed that, as the optical system for the second laser beam, the same optical system as the recording/reproducing device 10 of the first embodiment shown in FIG. 11 except for the irradiation light separation HOE 61 shown in FIG. 13 is added.

In FIG. 16A, on the above assumption, only the configuration of the main portions in the deviation amount detection in the detection optical system for the reflected light of the second laser beam is extracted and shown.

As described in FIG. 13, the focal point A and the focal point B are matched in view of the position of the focus direction, the focal point A is matched to the optical axis C in the linear direction, and the focal point B is deviated from the optical axis C in the linear direction.

Even in this case, the behavior of the light (the reflected light from the surface Surf for the 0-order light by the irradiation light separation HOE 61 of the second laser beam) incident from the focal point A through the objective lens 20 is equal to that of the first embodiment. That is, the light incident from the focal point A of the second laser beam through the objective lens 20 is divided into the 0-order light and the 1-order light deviated in the tracking direction by the detection light separation HOE 28 and the 0-order light and the 1-order light is focused by the focusing lens 29.

In the drawing, in the light incident from the focal point A focused by the focusing lens 29 through the objective lens 20, a focal point a-1 of a 1-order light component by the detection light separation HOE 28 is shown.

From the light beam incident from the focal point B through the objective lens 20, the 0-order light and the 1-order light are generated by the detection light separation HOE 28.

Here, the light incident from the focal point B through the objective lens 20 is hereinafter referred to as a B-light.

Although, in the drawing, a focal point b-1 formed by the focusing lens 29 of a 1-order light component by the detection light separation HOE 28 of the B-light is shown, since the focal point B is deviated from the focal point A in the linear direction as described above, similarly, the focal point b-1 is formed at a position deviated from the focal point a-1 in the linear direction.

In the second embodiment, a light-sensing portion 62 for a second laser shown in FIG. 16B is included.

As can be seen from the comparison with FIG. 8B, the light-receiving portion 62 for the second laser of the second embodiment is obtained by newly adding a B-light deviation amount detection PD 62-B to the light-sensing portion 31 for the second laser of the first embodiment.

The B-light deviation amount detection PD 62-B includes light-sensing elements E2, F2, G2 and H2 and, as shown in the drawing, a set of "E2 and G2" and a set of "F2 and H2" are adjacent to each other in the tracking direction. The arrangement position of the B-light deviation amount detection PD 62-B is determined such that the center (the reference position of the deviation amount=00) of the detection surface thereof is matched to the above-described focal point b-1 as shown in the drawing, in a state in which the focal point R of the second laser beam is matched to the reference surface Ref and tilt and lens shift are not generated.

For confirmation, even in this case, the arrangement positions of the position control PD 31-R and the tilt-caused deviation amount detection PD 31-A are equal to those of the first embodiment.

Although, in FIG. 16B, the focal point b-0 of the 0-order light by the detection light separation HOE 28 of the B-light is shown, since the 1-order light is output at a position deviated in the tracking direction by the detection light separation HOE 28, as shown in the drawing, the focal point b-0 and the focal point b-1 are deviated in the tracking direction.

Figure 17A:
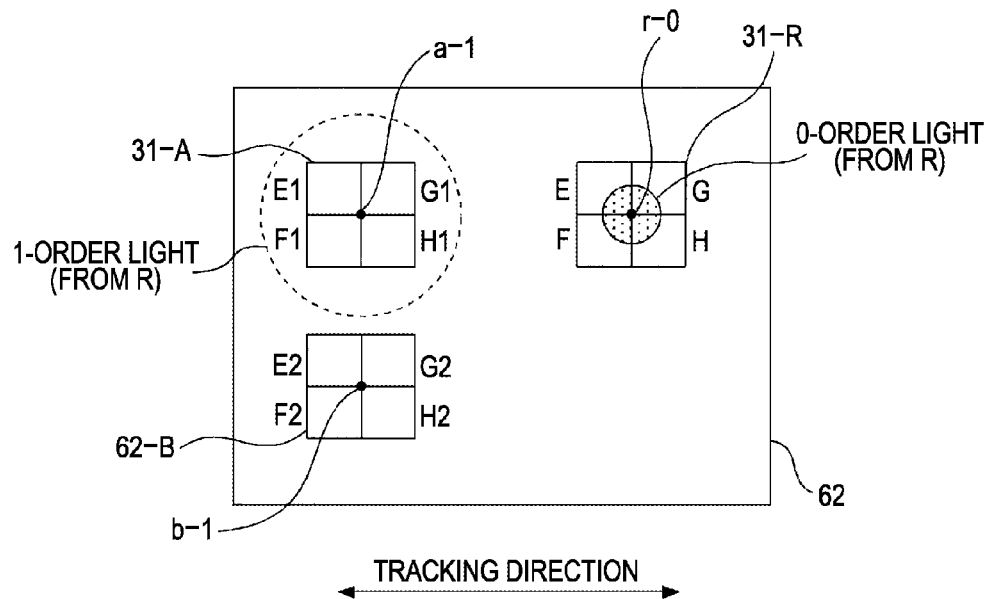
FIGS. 17A and 17B are diagrams illustrating a state of a light irradiated onto a light-sensing portion for a second laser included in an optical drive device according to a second embodiment.
Figure 17B:
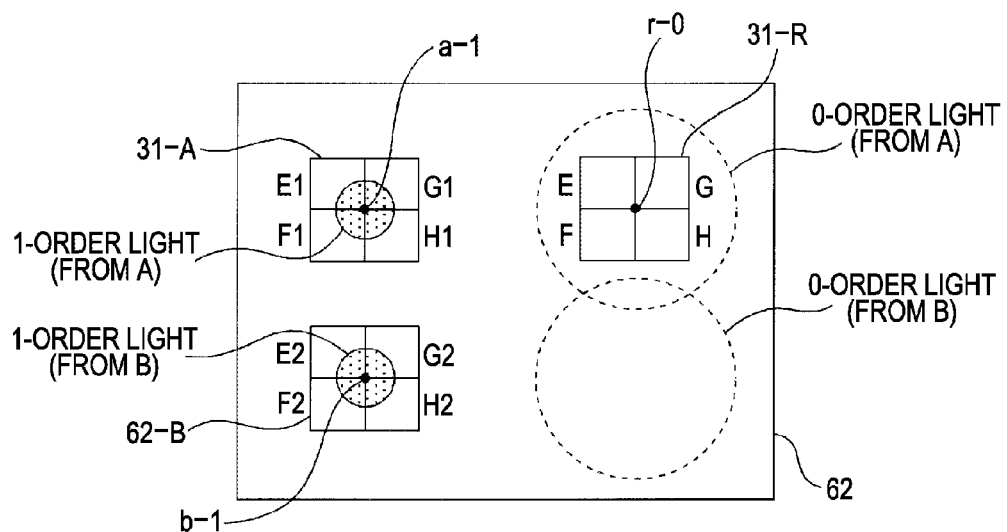

FIGS. 17A and 17B are diagrams illustrating a state of a light irradiated onto a light-sensing portion 62 for the second laser included in an optical drive device, wherein FIG. 17A shows the state of the reflected light from the focal point R and FIG. 17B shows the state of the light from the focal point A and the light from the focal point B.

As shown in FIG. 17A, even in this case, the reflected light from the focal point R is irradiated such that the 0-order light thereof forms a focusing spot on the position control PD 31-R and the 1-order light thereof is in a blurred state in the vicinity of the tilt-caused deviation amount detection PD 31-A, similarly to FIG. 9A.

In FIG. 17B, even in this case, the light from the focal point A is irradiated such that the 0-order light thereof is in a blurred state on the position control PD 31-R and the 1-order light thereof forms a focusing spot on the detection surface of the tilt-caused deviation amount detection PD 31-A, similarly to FIG. 9B.

In FIG. 17B, the light from the focal point B is irradiated such that the 0-order light is in a blurred state at a position deviated from the position control PD 31-R in the linear direction and the 1-order light forms a focusing spot on the detection surface of the B-light deviation amount detection PD 62-B.

As can be seen from FIGS. 17A and 17B, even in the second embodiment, using the 0-order light and the 1-order light output by the detection light separation HOE 28, only the focusing spot of the 0-order light of the reflected light from the focal point R may be formed on the position control PD 31-R and only the focusing spot of the 1-order light of the reflected light from the focal point A may be formed on the tilt-caused deviation amount detection PD 31-A.

In addition, only the focusing spot of the 1-order light of the light from the focal point B may be formed in the B-light deviation detection PD 62-B.

Accordingly, it is possible to independently perform the detection of the information for position control of the laser beam based on the reflected light from the reference surface Ref, the tilt detection (the detection of the spot deviation amount due to the tilt) based on the light from the focal point A, and the detection of the deviation amount (D_b_rad) of the B light based on the light from the focal point B.

The detection of the deviation amount (the deviation amount from the optical axis C of the focal point B) D_b_rad of the B-light may be calculated as follows based on the light-sensing signal by the light-sensing elements E2, F2, G2 and H2 of the B-light deviation amount detection PD 62-B.

$$D\_b\_rad = E2 + G2 - (F2 + H2) \quad \text{Equation 7}$$

In addition, the deviation amount D_b_tan of the B light in the linear direction may be calculated as follows.

$$D\_b\_tan = E2 + F2 - (G2 + H2) \quad \text{Equation 8}$$

As can be understood from the above description, in the second embodiment, using the value of the deviation amount D_b_rad of the B-light calculated by Equation 7 and the value of the deviation amount D_skew_rad (Equation 2) due to the tilt, which is calculated based on the light-sensing signal from the light-sensing elements E1, F1, G1 and H1 of the tilt-caused deviation amount detection PD 31-A, the deviation amount D_shift_rad due to the lens shift is obtained by Equation 6.

Accordingly, in the second embodiment, using the value of the deviation amount D_skew_rad due to the tilt and the value of the deviation amount D_shift_rad due to the lens shift, the spot position deviation of the first laser beam generated due to the tilt and the lens shift is corrected.

As can be seen from the above description, in the second embodiment, information (referred to as tilt side correction amount conversion information) indicating a relationship between the deviation amount due only to the tilt and the necessary correction amount and information (shift side correction amount conversion information) indicating a relationship between the deviation amount due only to the lens shift and the necessary correction amount are individually generated.

In the actual correction, the value of the correction amount according to the value of the deviation amount D_skew_rad due to the tilt based on the tilt side correction amount conversion information is obtained, the value of the correction amount according to the value of the deviation amount D_shift_rad due to the lens shift is obtained, and the value of a final correction amount for correcting the spot position deviation due to the tilt and the lens shift is obtained by adding the values of the correction amounts.

By controlling the driving of the galvanomirror 17 based on the obtained value of the final correction amount so as to adjust the optical axis of the first laser beam, it is possible to correct the spot position of the first laser beam to be matched to the spot position of the second laser beam in the tracking direction.

[4-3. Configuration of Optical Drive Device of Second Embodiment]

Figure 18:
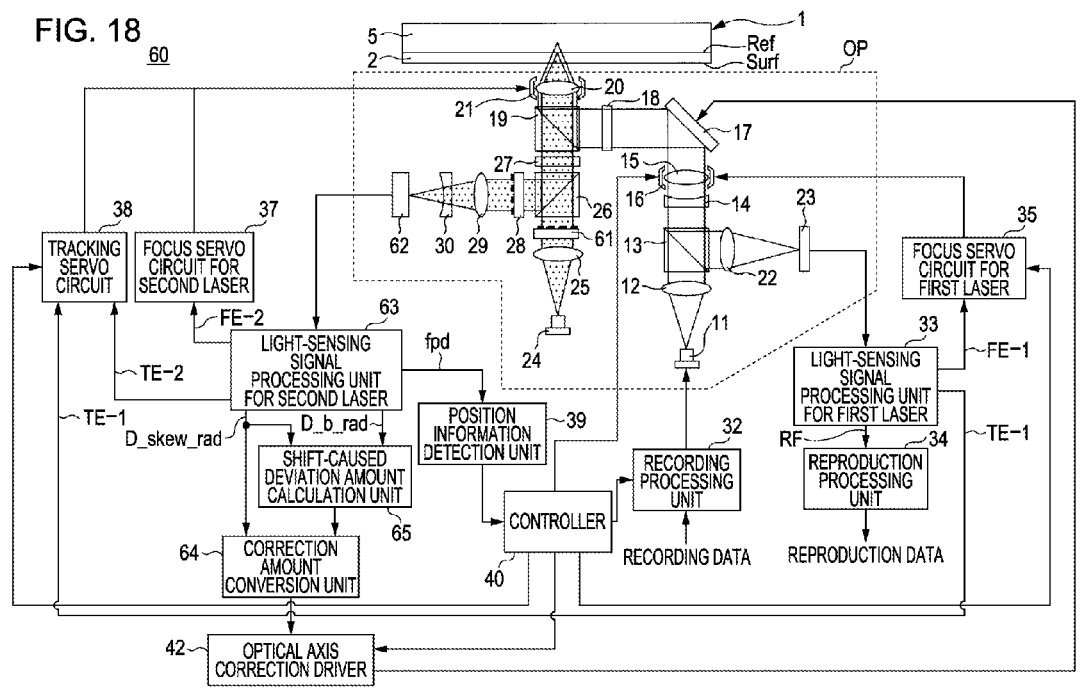
FIG. 18 is a diagram showing the internal configuration of an optical drive device according to a second embodiment.

FIG. 18 is a diagram showing the internal configuration of the recording/reproducing device 60 according to the second embodiment, for realizing the detection and the correction of the spot deviation due to the above-described lens shift.

In FIG. 18, the same portions as FIG. 11 are denoted by the same reference numerals and the description thereof will be omitted.

As can be seen from the comparison between FIG. 18 and FIG. 11, the recording/reproducing device 60 of the second embodiment is different from the recording/reproducing device 10 of the first embodiment in that the irradiation light separation HOE 61 described in FIG. 13 is inserted between the collimation lens 25 and the polarization beam splitter 26 and the light-sensing portion 62 for the second laser shown in FIG. 16 is included instead of the light-sensing portion 31 for the second laser.

In addition, it is different in that the light-sensing signal processing unit 63 for the second laser is included instead of the light-sensing signal processing unit 36 for the second laser and the correction amount conversion portion 64 is included instead of the correction amount conversion unit 41.

In addition, it is different in that a shift-caused deviation amount calculation unit 65 is newly added.

Figure 19:
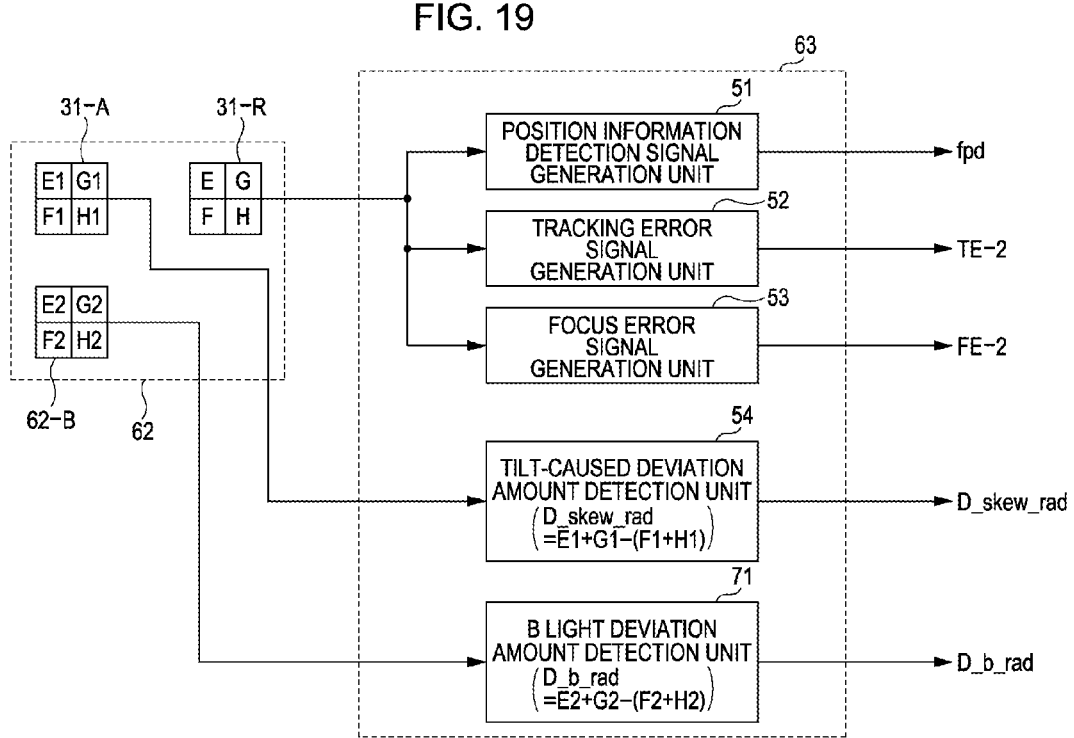
FIG. 19 is a diagram showing the internal configuration of a light-sensing signal processing unit for a second laser included in an optical drive device according to a second embodiment.
Figure 20:
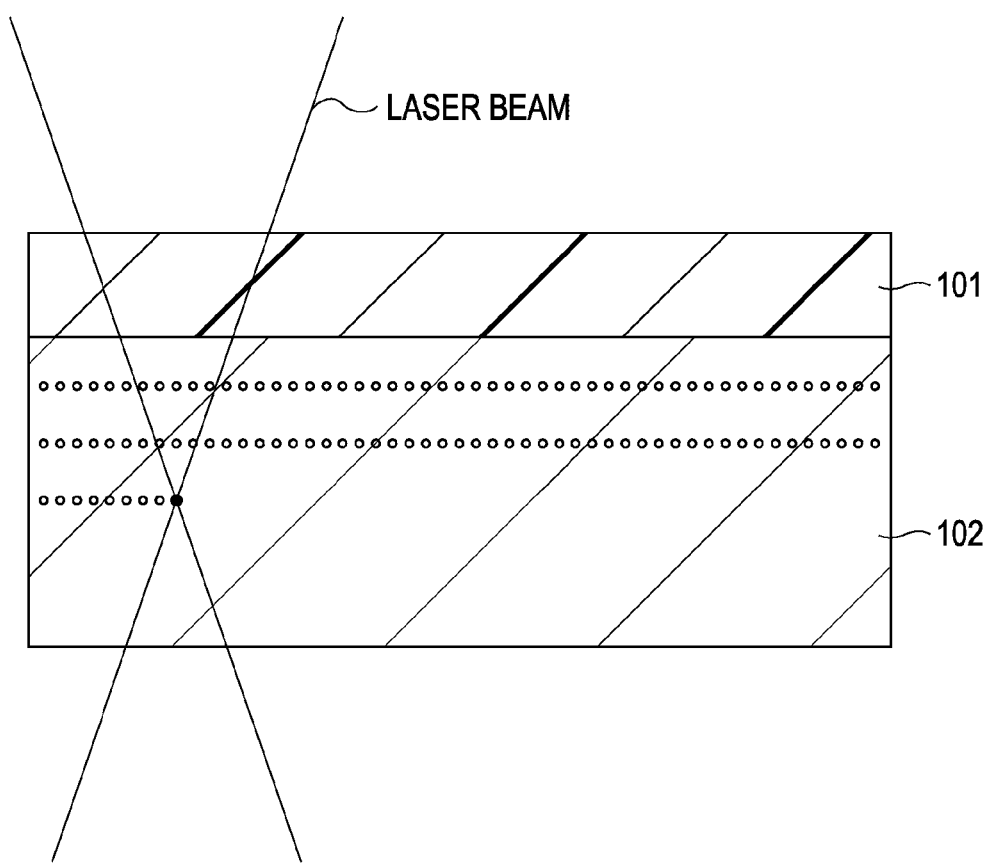
FIG. 20 is a diagram illustrating a bulk recording method.
Figure 21A:
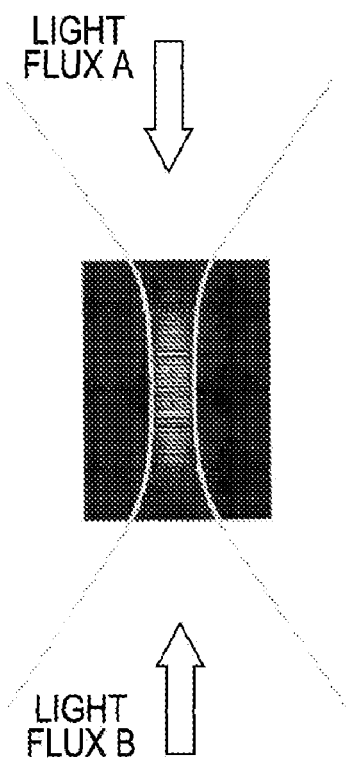
FIGS. 21A and 21B are diagrams illustrating a micro hologram method.
Figure 21B:
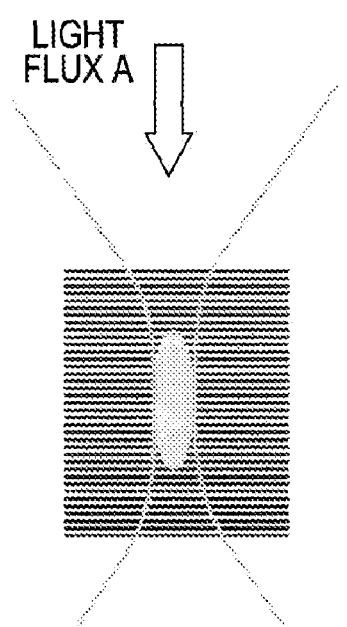
Figure 22A:
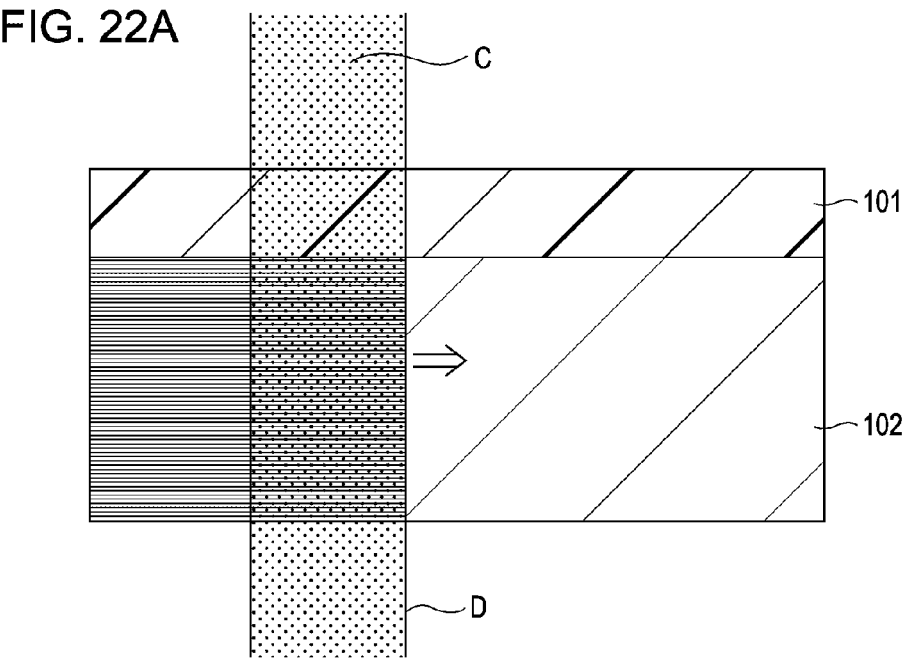
FIGS. 22A and 22B are diagram illustrating a negative type micro hologram method.
Figure 22B:
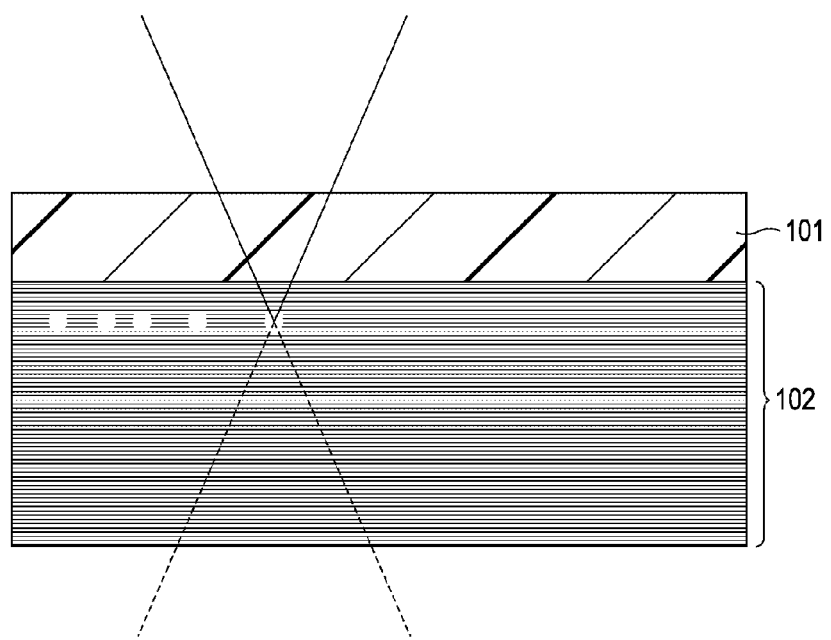
Figure 23:
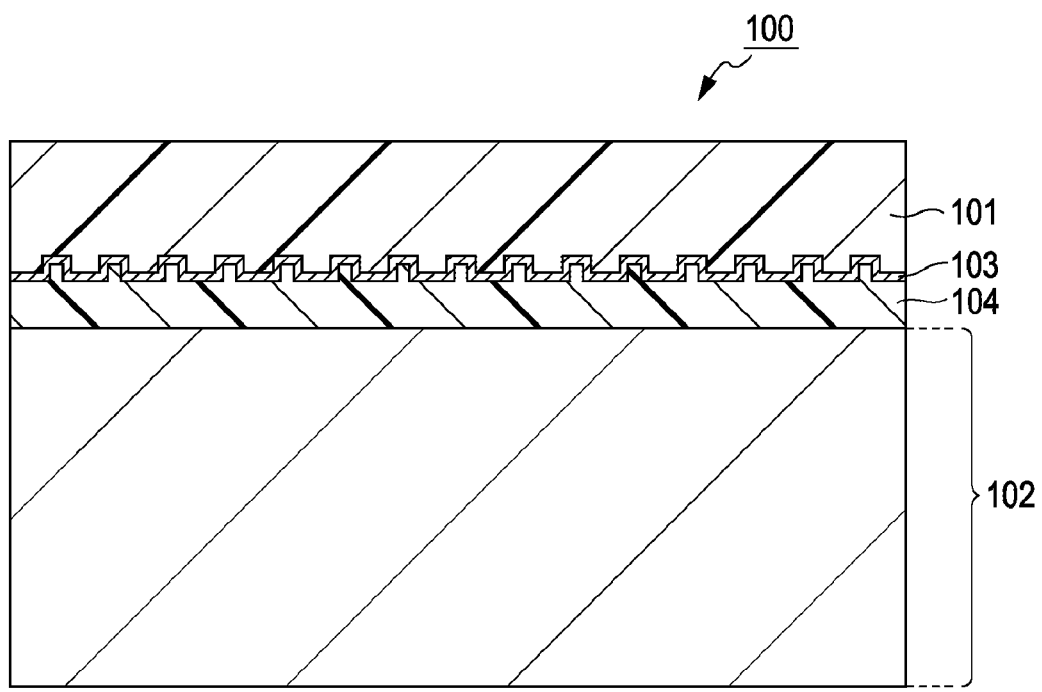
FIG. 23 is a diagram showing a cross-sectional structure of an actual bulk type recording medium having a reference surface.

FIG. 19 is a diagram showing the internal configuration of the light-sensing signal processing unit 63 for the second laser included in the recording/reproducing device 60 according to the second embodiment.

In FIG. 19, the light-sensing portion 62 for the second laser is also shown.

As can be seen from the comparison between FIG. 19 and FIG. 12, the light-sensing signal processing unit 63 for the second laser is obtained by newly adding a B-light deviation amount detection unit 71 to the light-sensing signal processing unit 36 for the second laser of the first embodiment.

The B-light deviation amount detection unit 71 performs the calculation of Equation 7 based on the light-sensing signals of the light-sensing elements E2, F2, G2 and H2 of the B-light deviation amount detection PD 62-B in the light-sensing portion 62 for the second laser and generates the deviation amount D_b_rad (hereinafter, referred to as a B-light error signal D_b_rad) of the B light.

The description returns to FIG. 18.

In FIG. 18, the tilt-caused deviation amount D_skew_rad (tilt-caused error signal) generated by the light-sensing signal processing unit 63 for the second laser is supplied to the correction amount conversion unit 64 and is supplied to the shift-caused deviation amount calculation unit 65.

The B-light error signal D_b_rad generated by the light-sensing signal processing unit 63 for the second laser is supplied to the shift-caused deviation amount calculation unit 65.

The shift-caused deviation amount calculation unit 65 performs an operation of Equation 6 based on the supplied tilt-caused error signal D_skew_rad and B-light error signal D_b_rad and calculates the value of the deviation amount=D_shift_rad due to the lens shift.

The value of the deviation amount D_shift_rad due to the lens shift calculated by the shift-caused deviation amount calculation unit 65 is supplied to the correction amount conversion unit 64.

In the correction amount conversion unit 64, the above-described tilt side correction amount conversion information and shift side correction amount conversion information are set.

The correction amount conversion unit 64 obtains the value of the correction amount according to the value of the deviation amount D_skew_rad due to the tilt based on the tilt side correction conversion information and obtains the value of the correction amount according to the value of the deviation amount D_shift_rad due to the lens shift based on the shift side correction amount conversion information.

Then, the obtained values of the correction amounts are added so as to obtain the value of the final correction amount for correcting the spot position deviation due to the tilt and the lens shift and the value of the final correction amount is supplied to the optical axis correction driver 42.

The optical axis correction driver 42 controls the driving of the galvanomirror 17 based on the value of the final correction amount obtained by the correction amount conversion unit 64 so as to adjust the optical axis of the first laser beam such that the spot position of the first laser beam is corrected to be matched to the spot position of the second laser beam in the tracking direction.

According to the second embodiment, using the reflected light from the bulk type recording medium 1 of the second laser beam as the position control light, it is possible to perform the detection and the correction of the spot position deviation due to the tilt and the spot position deviation due to the lens shift.

In the related art, in the case where the spot position deviation due to both the tilt and the lens shift is detected and corrected, the technology disclosed in Japanese Unexamined Patent Application Publication No. 2008-71435 and the technology disclosed in Japanese Unexamined Patent Application Publication No. 2008-310848 are combined. However, in this case, it is difficult to individually detect the deviation amount due to the tilt and the deviation amount due to the lens shift using the light from the same light source.

In contrast, according to the second embodiment, since the detection of the deviation amount due to the tilt and the detection of the deviation amount due to the lens shift are performed using the common light source as the second laser 24, the configuration therefor may be assembled in the optical system of the second laser beam. Accordingly, it is possible to realize simplification of the configuration, reduction in the number of parts, reduction in cost for manufacturing the device, and miniaturization of the device.

In addition, in the second embodiment, since the reflected light from the focal point R for performing the position control such as servo and each of the lights from the focal point A and the focal point B for detecting the deviation amount due to the tilt and the lens shift enter into the detection light separation HOE 28 so as to perform the detection, the position control PD, the tilt-caused deviation amount detection PD 31-A and the B-light deviation amount detection PD 62-B may be disposed at close positions, as compared with the case where each light is spectrally split by a semi-transparent mirror or the like. Accordingly, in the second embodiment, as shown in FIG. 16B or the like, since the position control PD, the tilt-caused deviation amount detection PD 31-A and the B-light deviation amount detection PD 62-B may be integrally provided in the common light-sensing portion, the PDs are not divisionally disposed as separate light-sensing portions. That is, accordingly, the number of parts is reduced.

5. Modified Example

Although the embodiments of the present invention have been described, the present invention is not limited to the detailed examples which have been described up to now.

For example, although the correction of only the spot position deviation in the tracking direction is described in the above description, the spot position deviation in the linear direction may be detected and corrected according to the same method as the above-described detection and correction of the spot position deviation in the tracking direction.

Although, in the above description, the case where the correction of the spot position deviation of the first laser beam is performed by adjusting the optical axis of the first laser beam using the galvanomirror 17 is described, the correction of the spot position of the first laser beam may be performed by another means.

For example, in the first embodiment in which only the spot position deviation due to the tilt is detected and corrected, the spot position of the first laser beam is not corrected, the bulk type recording medium 1 may be inclined, the overall optical pickup OP may be inclined, or the tilt itself may be corrected. If the tilt itself is corrected, since the correction is applied to the value of the deviation amount D_skew_rad, the correction control in this case may be performed by feedback control.

In the second embodiment in which the spot position deviation due to the lens shift is also detected and corrected, the spot position deviation amount D_shift due to the lens shift is obtained by the calculation of "the deviation amount D_b of the B point—the deviation amount D_skew due to the tilt×2". At this time, if the tilt itself is corrected, the value of the deviation amount D_skew due to the tilt is not adequately detected and thus the spot position deviation amount D_shift due to the lens shift is not detected. Accordingly, in the case where the spot position deviation due to the lens shift is detected and corrected, the spot position of the first laser beam becomes an object to be corrected.

Although, in the second embodiment, the deviation of the light-sensing position for the 1-order light component by the detection light separation HOE 28 of the B light is detected in the detection of the deviation amount of the B light, since the B light may be obtained at the position deviated in the linear direction by the action of the irradiation light separation HOE 61, the detection of the deviation amount of the B light may be performed with respect to the 0-order light component by the detection light separation HOE 28 of the B light.

In this case, the B-light deviation amount detection PD 62-B is disposed such that the center (reference position) thereof is matched to the focal point b-0 shown in FIG. 16B.

Although the case of applying the embodiment of the present invention to the recording/reproducing device for performing recording and reproduction with respect to the optical recording medium is described in the above description, the embodiment of the present invention is suitably applicable to a device dedicated to recording (recording device), in which only recording is possible with respect to an optical recording medium. Alternatively, the embodiment of the present invention is suitably applicable to a device dedicated to reproduction (reproducing device), in which only reproduction is possible.

The present application contains subject matter related to that disclosed in Japanese Priority Patent Application JP 2009-244389 filed in the Japan Patent Office on Oct. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical drive device for performing information recording or reproduction of recorded information by formation of a mark by focusing a first light at a necessary position in a recording layer of an optical recording medium by an objective lens, the optical drive device comprising:

a position control unit configured to focus a second light on a reflection film, in which a position guide element of the optical recording medium is formed, through the objective lens and to enable a spot position of the second light to follow the position guide element based on a reflected light of the second light focused on the reflection film so as to control a position of the objective lens;

a first focusing unit configured to focus the reflected light from the optical recording medium of the second light incident through the objective lens by irradiating the second light to the optical recording medium;

a first light-sensing portion disposed such that a spot of the reflected light from a surface of the optical recording medium included in the reflected light of the second light focused by the first focusing unit is formed on a light-sensing surface thereof; and a surface reflection light deviation amount detection unit configured to detect a deviation amount from a reference position in the light-sensing surface of the spot of the reflected light from the light-sensing surface, based on a light-sensing signal by the first light-sensing portion;

the spectroscopic element includes a first hologram element and spectrally splits the reflected light of the second light incident through the objective lens by diffraction, the first focusing unit is disposed at a position where both a 0-order light and a 1-order light spectrally split by the spectroscopic element as the first hologram element are focused; and the first light-sensing portion is disposed at a position where the spot by the first focusing unit of the reflected light from the surface included in the 1-order light side output from the spectroscopic element is formed on the light-sensing surface.

2. The optical drive device according to claim 1, further comprising:

a spectroscopic element configured to spectrally split the reflected light of the second light incident from the optical recording medium through the objective lens, wherein the first focusing unit is disposed at a position where at least one light spectrally split by the first spectroscopic element is focused.

3. The optical drive device according to claim 1, further comprising:

a first focusing position correction unit configured to correct a focusing position in the recording layer of the first light, based on information about the deviation amount detected by the surface reflection light deviation amount detection unit.

4. The optical drive device according to claim 1, further comprising:

a detection light irradiation unit comprising a second hologram element inserted at a position which is a light source side rather than a spectroscopic point for spectrally splitting the reflected light from the optical recording medium of the second light, in an optical path for guiding the second light emitted from a light source to the objective lens, and configured to receive a 1-order light output from the second hologram element through the objective lens and to irradiate a detection light focused at a position which is a rear side from the reflection film by a distance twice a distance between the surface of the optical recording medium and the reflection film;

a second focusing unit configured to focus the reflected light from the optical recording medium of the detection light incident through the objective lens by irradiating the detection light to the optical recording medium;

a second light-sensing portion disposed such that a spot of the reflected light from the reflection film of the detection light included in the reflected light of the detection light focused by the second focusing unit is formed on a light-sensing surface thereof; and a detection light deviation amount detection unit configured to detect a deviation amount from a reference position in the light-receiving surface of the spot of the reflected light from the reflection film of the detection light, based on a light-sensing signal by the second light-sensing portion.

5. The optical drive device according to claim 4, wherein:

the first focusing unit and the second focusing unit are the same focusing element, and the same focusing element is disposed at a position where the reflected light from the optical recording medium of a 0-order light component of the second light output from the second hologram element and the reflected light from the optical recording medium of the detection light are incident, a third hologram element is configured to receive the reflected light from the optical recording medium focused by the same focusing element, the first light-sensing portion is disposed at a position where the spot by the same focusing element of the reflected light from the surface included in a 1-order light side of the third hologram element is formed on the light-sensing surface, and the second light-sensing portion is disposed at a position where the spot by the same focusing element of the reflected light from the reflection film of the detection light included in the 1-order light side of the third hologram element is formed on the light-sensing surface.

6. The optical drive device according to claim 4, further comprising:

a second focusing position correction unit configured to correct a focusing position in the recording layer of the first light, based on information about the deviation amount detected by the surface reflection light deviation amount detection unit and on information about the deviation amount detected by the detection light deviation amount detection unit.

7. The optical drive device according to claim 4, wherein, when a value of the deviation amount detected by the surface reflection light deviation amount detection unit is D skew and a value of the deviation amount detected by the detection light deviation amount detection unit is D b, the second focusing position correction unit corrects the focusing position in the recording layer of the first light, based on the value D skew and a value D b-2·D skew.

8. The optical drive device according to claim 3 or 6, wherein the first or second focusing position correction unit corrects the focusing position in the recording layer of the first light, by adjusting an optical axis of the first light by a variable-angle mirror for guiding the first light to the objective lens.

9. The optical drive device according to claim 4, wherein the optical recording medium is a disk-shaped recording medium and the second hologram element is configured to output a diffracted light at a position deviated in a circumferential direction of the optical recording medium.

* * * * *